United States Patent
Kawano

(10) Patent No.: US 10,036,880 B2
(45) Date of Patent: Jul. 31, 2018

(54) MICROSCOPE APPARATUS

(71) Applicant: OLYMPUS CORPORATION, Shibuya-ku, Tokyo (JP)

(72) Inventor: Yoshihiro Kawano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 137 days.

(21) Appl. No.: 14/928,544

(22) Filed: Oct. 30, 2015

(65) Prior Publication Data

US 2016/0131886 A1    May 12, 2016

(30) Foreign Application Priority Data

Nov. 7, 2014 (JP) ................................. 2014-226668
Sep. 9, 2015 (JP) ................................. 2015-177483

(51) Int. Cl.
*G02B 21/16* (2006.01)
*G02B 21/12* (2006.01)
*G02B 21/24* (2006.01)

(52) U.S. Cl.
CPC ............. *G02B 21/12* (2013.01); *G02B 21/16* (2013.01); *G02B 21/24* (2013.01)

(58) Field of Classification Search
None
See application file for complete search history.

(56) References Cited

U.S. PATENT DOCUMENTS

| | | | |
|---|---|---|---|
| 6,219,180 B1 | 4/2001 | Hasegawa et al. | |
| 6,674,574 B1 * | 1/2004 | Aono | G02B 21/025 250/201.3 |
| 8,164,623 B2 * | 4/2012 | Aizaki | G02B 21/362 348/79 |
| 2004/0080817 A1 * | 4/2004 | Yamaguchi | G02B 21/0016 359/385 |
| 2007/0236785 A1 | 10/2007 | Matsumoto | |
| 2008/0068708 A1 * | 3/2008 | Shirota | G02B 21/365 359/368 |
| 2008/0310017 A1 | 12/2008 | Nolte et al. | |

(Continued)

FOREIGN PATENT DOCUMENTS

| EP | 1785761 A1 * | 5/2007 | ......... G01N 21/6458 |
|---|---|---|---|
| JP | 2013029837 A | 2/2013 | |

OTHER PUBLICATIONS

Extended European Search Report dated May 30, 2016, issued in counterpart European Application No. 15192747.2.

*Primary Examiner* — Derek S Chapel
(74) *Attorney, Agent, or Firm* — Holtz, Holtz & Volek PC

(57) ABSTRACT

A microscope apparatus according to the present invention includes a bright-field illumination optical system and a fluorescence illumination optical system that respectively radiate illumination light and excitation light onto a sample, an observation optical system that observes observation light from the sample, and a controller that controls the fluorescence illumination optical system so that the excitation light is radiated onto the sample when the irradiation of the illumination light on the sample is prevented by an irradiation preventing portion of the bright-field illumination optical system and so that the irradiation of the excitation light on the sample is prevented when the irradiation of the illumination light on the sample is not prevented by the irradiation preventing portion.

8 Claims, 20 Drawing Sheets

(56) References Cited

U.S. PATENT DOCUMENTS

| | | | |
|---|---|---|---|
| 2009/0212242 A1* | 8/2009 | Yamada | G01N 21/6458 250/580 |
| 2011/0136152 A1* | 6/2011 | Lin | G01N 15/1475 435/7.25 |
| 2013/0027769 A1 | 1/2013 | Weiss | |
| 2013/0176618 A1* | 7/2013 | Hayashi | G02B 21/088 359/385 |

* cited by examiner

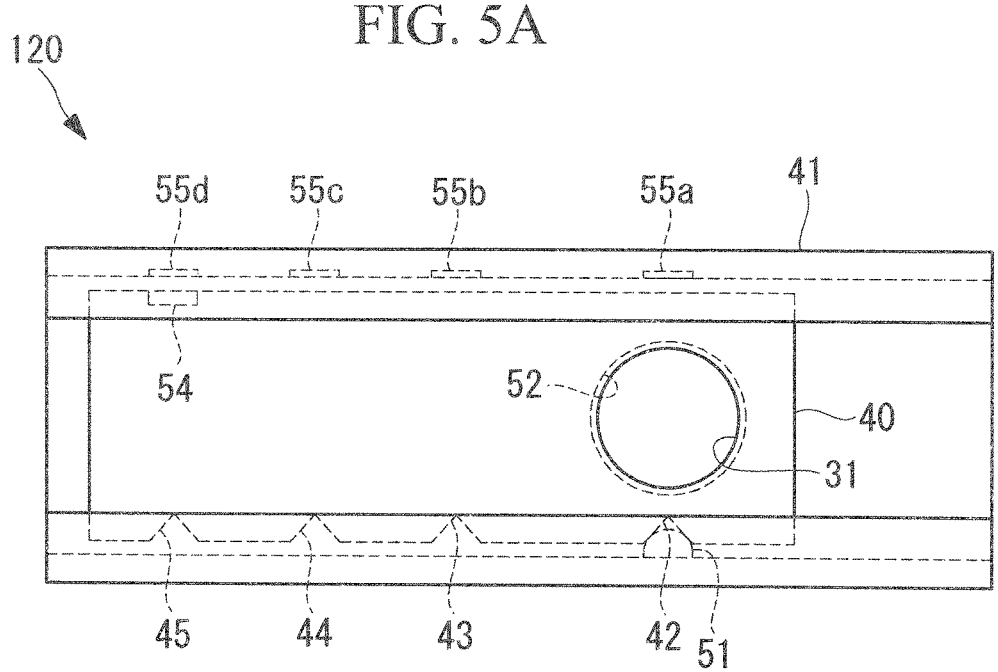
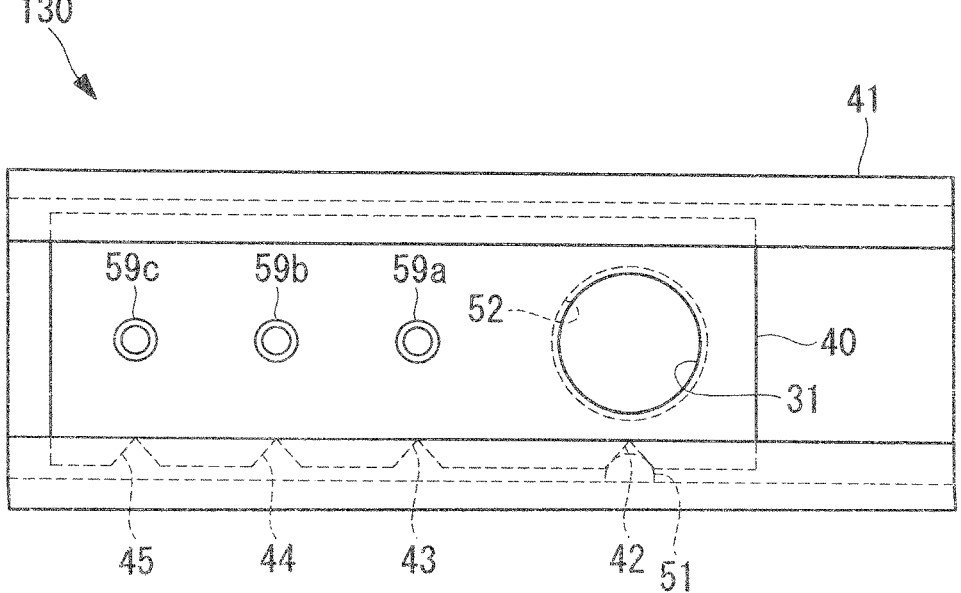

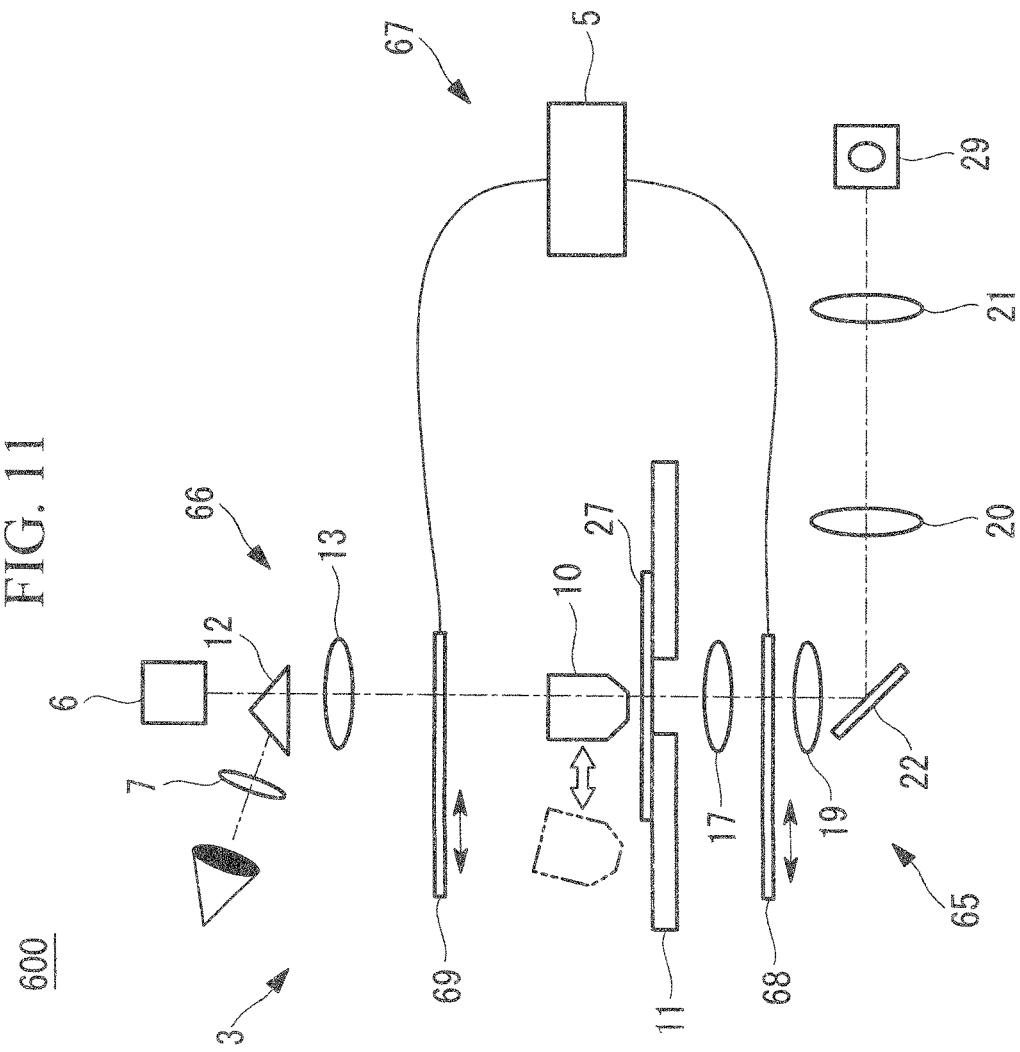

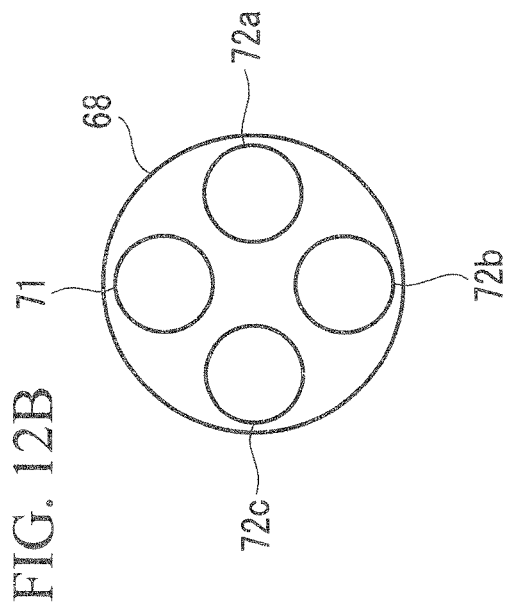
FIG. 12A
FIG. 12B
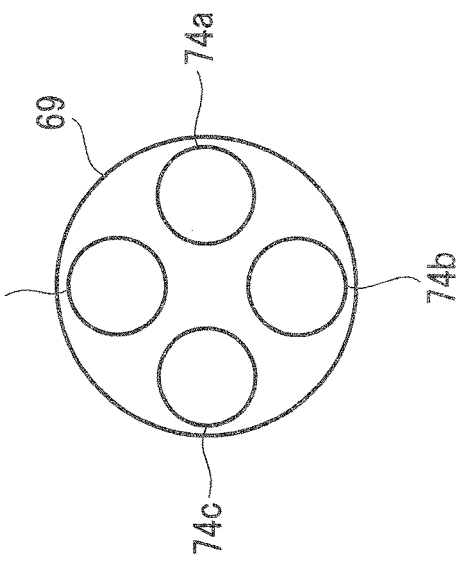
FIG. 12C
FIG. 12D

MICROSCOPE APPARATUS

CROSS-REFERENCE TO RELATED APPLICATIONS

This application is based on Japanese Patent Application No. 2014-226668 filed on Nov. 7, 2014, and Japanese Patent Application No. 2015-177483 filed on Sep. 9, 2015, the contents of which are incorporated herein by reference.

TECHNICAL FIELD

The present invention relates to microscope apparatuses.

BACKGROUND ART

With the development of technologies for labeling target substances in biological samples, such as fluorescent labeling and luminescent labeling, in recent years, there have been demands for observing the same sample using multiple kinds of observation methods, such as bright-field observation, fluorescence observation, and luminescence observation. For example, Patent Literature 1 discloses a microscope that can switch between bright-field observation and fluorescence observation.

When the same sample is to be observed using multiple kinds of observation methods, there are demands from users for quickly switching between the observation methods.

CITATION LIST

Patent Literature

{PTL 1}
Japanese Unexamined Patent Application, Publication No, 2013-29837

SUMMARY OF INVENTION

A first aspect of the present invention provides a microscope apparatus including a bright-field illumination optical system that radiates illumination light onto a sample for performing bright-field observation of the sample; a fluorescence illumination optical system that radiates excitation light onto the sample for performing fluorescence observation of the sample; an observation optical system that observes observation light from the sample; and a controller that controls at least the fluorescence illumination optical system. The bright-field illumination optical system includes an irradiation preventing portion that prevents irradiation of the illumination light on the sample. When the irradiation of the illumination light on the sample by the bright-field illumination optical system is being prevented by the irradiation preventing portion, the controller causes the fluorescence illumination optical system to radiate the excitation light onto the sample. When the irradiation of the illumination light on the sample by the bright-field illumination optical system is not prevented by the irradiation preventing portion, the controller prevents the irradiation of the excitation light on the sample by the fluorescence illumination optical system.

A second aspect of the present invention provides a microscope apparatus including an illumination optical system that radiates light onto a sample for performing bright-field observation and fluorescence observation of the sample; an observation optical system that observes light from the sample; and a switching mechanism that switches between bright-field observation and fluorescence observation. The switching mechanism includes a first switching portions that disposes one of a neutral density filter and an excitation filter in an optical path of the illumination optical system, a second switching portion that inserts and withdraws an emission filter into and from an optical path of the observation optical system, and a controller that controls at least the second switching portion. When the excitation filter is inserted into the optical path of the illumination optical system by the first switching portion, the controller causes the second switching portion to insert the emission filter into the optical path of the observation optical system. When the neutral density filter is inserted into the optical path of the illumination optical system by the first switching portion, the controller causes the second switching portion to withdraw the emission filter from the optical path of the observation optical system.

BRIEF DESCRIPTION OF DRAWINGS

FIG. 5A is an explanatory diagram that schematically illustrates the configuration of a modification of the slider (irradiation preventing portion) in the microscope apparatus according to the first embodiment of the present invention.

FIG. 5B is an explanatory diagram that schematically illustrates the configuration of another modification of the slider (irradiation preventing portion) in the microscope apparatus according to the first embodiment of the present invention.

FIG. 11 is an explanatory diagram that schematically illustrates the configuration of a microscope apparatus according to a third embodiment of the present invention.

FIG. 12A is an explanatory diagram that schematically illustrates the configuration of a first switching portion in the microscope apparatus according to the third embodiment of the present invention.

FIG. 12B is an explanatory diagram that schematically illustrates the configuration of a modification of the first switching portion in FIG. 12A.

FIG. 12C is an explanatory diagram that schematically illustrates the configuration of a second switching portion in the microscope apparatus according to the third embodiment of the present invention.

FIG. 12D is an explanatory diagram that schematically illustrates the configuration of a modification of the second switching portion in FIG. 12C.

DESCRIPTION OF EMBODIMENTS

First Embodiment

A microscope apparatus 100 according to a first embodiment of the present invention will be described below with reference to FIGS. 1 to 8.

Figure 1:
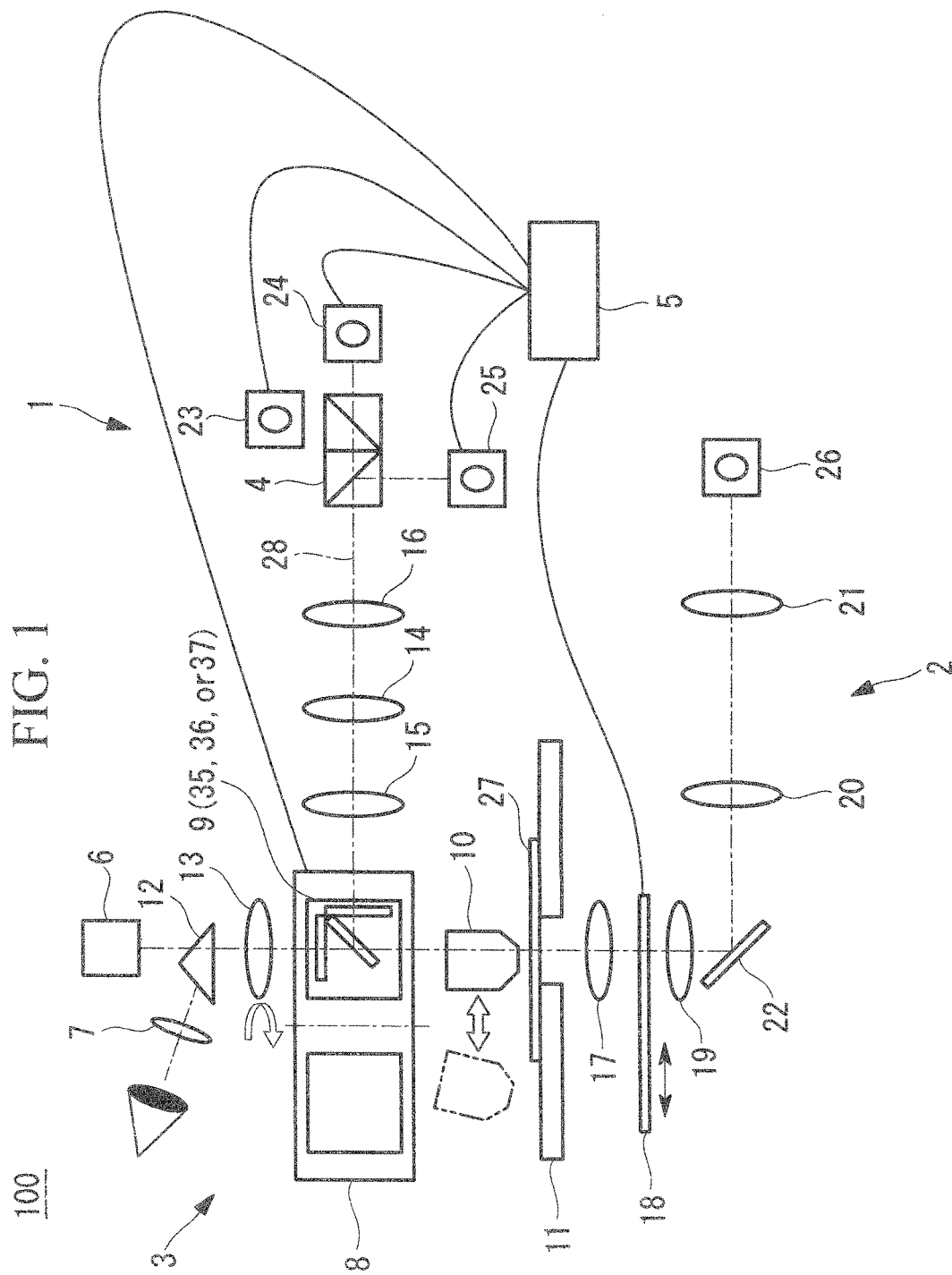
FIG. 1 is an explanatory diagram that schematically illustrates the configuration of a microscope apparatus according to a first embodiment of the present invention.

The microscope apparatus 100 according to this embodiment has the configuration shown in FIG. 1.

The microscope apparatus 100 includes a fluorescence illumination optical system 1 that performs epi-illumination of a sample 27, a bright-field illumination optical system 2 that performs trans-illumination of the sample 27, an observation optical system 3 used for observing observation light from the sample 27, and a controller 5 that controls at least the fluorescence illumination optical system 1.

The fluorescence illumination optical system 1 radiates excitation light onto the sample 27 when fluorescence observation is performed. The fluorescence illumination optical system 1 has a plurality of light emitting diodes (fluorescence illumination LEDs) 23, 24, and 25 as excitation light sources. The LEDs 23, 24, and 25 emit light beams of different wavelengths. The light beams from the LEDs 23, 24, and 25 are introduced to an excitation-light irradiation optical path 28 by a dichroic mirror 4, are converted into substantially collimated light beams by a collimator lens 16, pass through a lens 14 and a lens 15, and enter a fluorescence cube 9. From among the light beams entering the fluorescence cube 9, only excitation light of a desired wavelength is selected by an excitation-light filter within the fluorescence cube 9. Then, the selected excitation light is reflected toward the sample 27 by a dichroic mirror within the fluorescence cube 9 and is focused on the sample 27 on a stage 11 by an objective lens 10.

The fluorescence cube 9 is disposed within a fluorescence turret 8. The fluorescence turret 8 has the structure shown in, for example, FIG. 2D. The fluorescence turret 8 includes multiple types of fluorescence cubes 35, 36, and 37 disposed therein. The fluorescence turret 8 can also have a hole which does not have a fluorescence cube disposed therein, for allowing light to pass through. The multiple fluorescence cubes 35, 36, and 37 respectively correspond to the LEDs 23, 24, and 25 and have wavelength characteristics that correspond to the wavelengths of light beams emitted from the LEDs 23, 24, and 25 and fluorescences excited by the light beams. The fluorescence turret 8 is capable of selectively disposing the fluorescence cubes 35, 36, and 37 and the hole 34 in the optical path.

The bright-field illumination optical system 2 illuminates the sample 27 when bright-field observation is performed and includes an LED (trans-illumination LED) 26 as a light source. Illumination light output from the LED 26 is converted into substantially collimated light by a collimator lens 21, passes through a lens 20, is reflected toward the sample 27 by a mirror 22, and is radiated onto the sample 27 on the stage 11 via a lens 19 and a condenser lens 17.

The observation optical system 3 is used for observing observation light from the sample 27 with a charge-coupled device (CCD) camera 6 or by visual observation. In the observation optical system 3, the observation light from the sample 27 that has passed through the objective lens 10 and the fluorescence turret 8 passes through an imaging lens 13 and is distributed to the CCD camera 6 and an ocular lens 7 by a prism 12, so as to be observed with the CCD camera 6 or by visual observation.

Figure 2A:
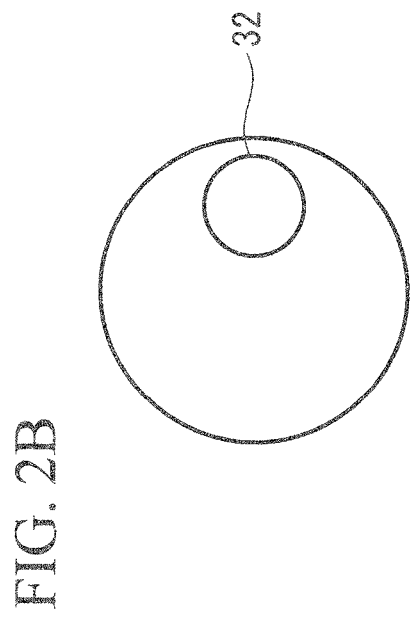
FIG. 2A is an explanatory diagram that schematically illustrates the configuration of a slider in the microscope apparatus in FIG. 1.
Figure 2B:
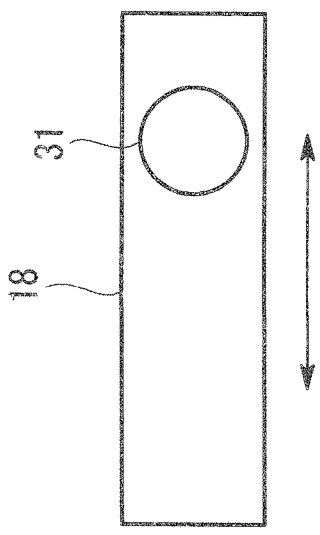
FIG. 2B is an explanatory diagram that schematically illustrates the configuration of a turret in the microscope apparatus in FIG. 1.
Figure 2C:
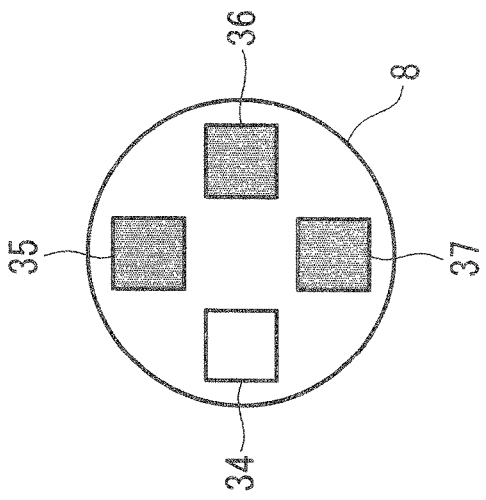
FIG. 2C is an explanatory diagram that schematically illustrates the configuration of a prism in the microscope apparatus in FIG. 1.
Figure 2D:
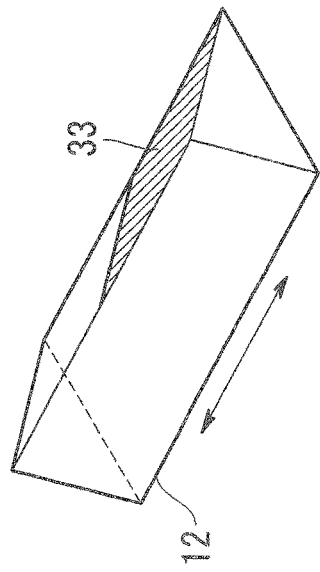
FIG. 2D is an explanatory diagram that schematically illustrates the configuration of a fluorescence turret in the microscope apparatus in FIG. 1.

The prism 12 has a triangular prismatic structure shown in FIG. 2C and has a mirror 33 formed on a part thereof. The prism 12 is movable in the direction of the arrow shown in FIG. 2C. By inserting or withdrawing the prism 12 into or from the optical path, the observation light can be distributed to one of the CCD camera 6 and the ocular lens 7. Specifically, by inserting the mirror 33 into the optical path, the observation light is reflected toward the ocular lens 7. In contrast, by withdrawing the mirror 33 from the optical path, the observation light is transmitted toward the CCD camera 6. Alternatively, a half mirror may be used as the mirror 33 so that the observation light can be simultaneously transmitted and reflected toward both the CCD camera 6 and the ocular lens 7.

The following description relates to a case where bright-field observation is performed by using the microscope apparatus 100.

In a state where the LED 26 is turned on, the LEDs 23, 24, and 25 are turned off, and the fluorescence turret 8 is set in a state where the hole 34, which does not have a fluorescence cube therein, is disposed in the optical path. Illumination light emitted from the LED 26 is converted into substantially collimated light by the collimator lens 21, passes through the lens 20, and is reflected toward the sample 27 by the mirror 22. The reflected light reaches a slider 18 (irradiation preventing portion) via the lens 19.

The slider 18 has the structure shown in FIG. 2A and has a hole 31 that allows the illumination light to pass through. When bright-field observation is performed, the slider 18 is slid so that the hole 31 is disposed in the optical path.

The illumination light from the lens 19 passes through the hole 31 in the slider 18 and is radiated onto the sample 27 on the stage 11 via the condenser lens 17. The illumination light (observation light) transmitted through the sample 27 passes through the objective lens 10, the hole 34 in the fluorescence turret 8, and the imaging lens 13 and is distributed to both of or one of the CCD camera 6 and the ocular lens 7 by the prism 12, so as to be observed with both of or one of the CCD camera 6 and the ocular lens 7.

The following description relates to a case where fluorescence observation is performed by using the microscope apparatus 100.

In a state where any one of the LEDs 23, 24, and 25 is turned on, the LED 26 is turned off, and the fluorescence turret 8 is set in a state where the fluorescence cube 9 (35, 36, or 37) corresponding to any of the LEDs 23, 24, and 25 in the on state is disposed in the optical path of excitation light. Excitation light emitted from any one of the LEDs 23, 24, and 25 in the on state is converted into substantially collimated light by the collimator lens 16, passes through the lens 14 and the lens 15, and enters the fluorescence cube 9. Subsequently, with regard to the excitation light, only excitation light of a desired wavelength is selected by the excitation-light filter within the fluorescence cube 9. Then, the selected excitation light is reflected toward the sample 27 by the dichroic mirror within the fluorescence cube 9 and is focused on the sample 27 on the stage 11 by the objective lens 10.

Fluorescence (observation light) generated from the sample 27 as a result of it being irradiated with the excitation light is collected by the objective lens 10 and passes through the dichroic mirror within the fluorescence cube 9. Then, only fluorescence of a desired wavelength is selected by a fluorescence filter within the fluorescence cube 9. Subsequently, the fluorescence passes through the imaging lens 13 and is distributed to both of or one of the CCD camera 6 and the ocular lens 7 by the prism 12, so as to be observed with both of or one of the CCD camera 6 and the ocular lens 7.

Next, a method of switching between bright-field observation and fluorescence observation by using the microscope apparatus 100 will be described.

When switching from bright-field observation to fluorescence observation, a user slides the slider 18 to withdraw the hole 31 from the optical path of the illumination light and to dispose a portion (shutter) of the slider 18 excluding the hole 31 in the optical path of the illumination light. In conjunction with this sliding operation of the slider 18, the controller 5 turns on any one of the LEDs 23, 24, and 25 and rotates the fluorescence turret 8 so as to dispose the corresponding fluorescence cube 9 in the optical path.

When switching from fluorescence observation to bright-field observation, the user slides the slider 18 to dispose the hole 31 in the optical path of the illumination light. In conjunction with this sliding operation of the slider 18, the controller 5 turns off the LEDs 23, 24, and 25 and rotates the fluorescence turret 8 so as to dispose the hole 34, which does not have a fluorescence cube therein, in the optical path.

Next, a switching operation of the slider 18 performed by the user will be described.

Figure 3A:
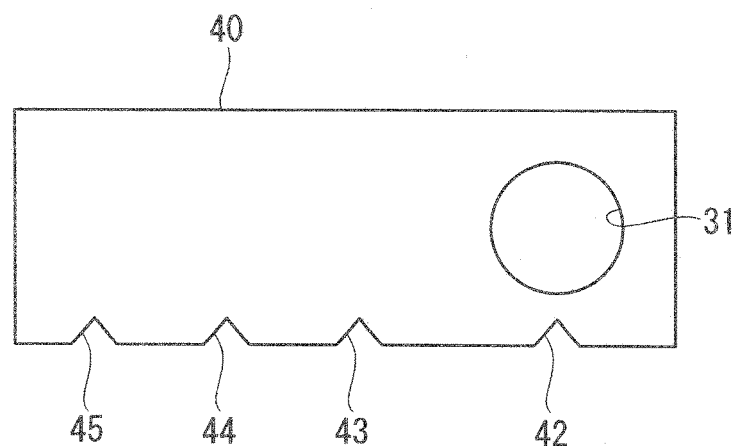
FIG. 3A is an explanatory diagram that schematically illustrates the configuration of the slider (irradiation preventing portion) in the microscope apparatus according to the first embodiment of the present invention and is a plan view of a plate-like member.
Figure 3B:
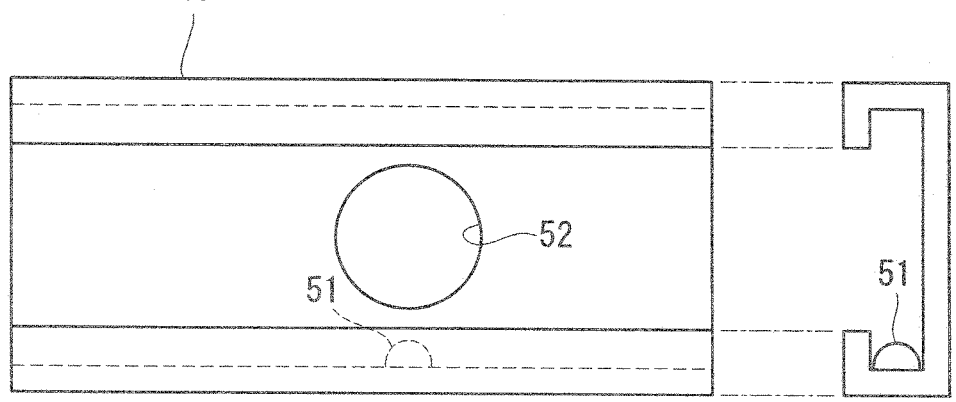
FIG. 3B is an explanatory diagram that schematically illustrates the configuration of the slider (irradiation preventing portion) in the microscope apparatus according to the first embodiment of the present invention and is a plan view of a rail.
Figure 4A:
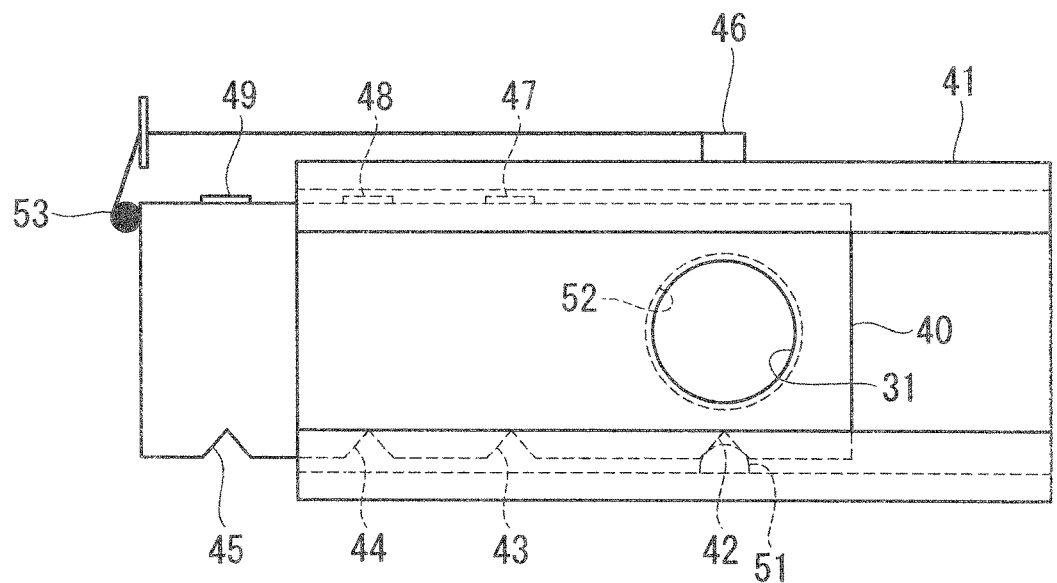
FIG. 4A is an explanatory diagram that schematically illustrates the configuration of the slider (irradiation preventing portion) in the microscope apparatus according to the first embodiment of the present invention.
Figure 4B:
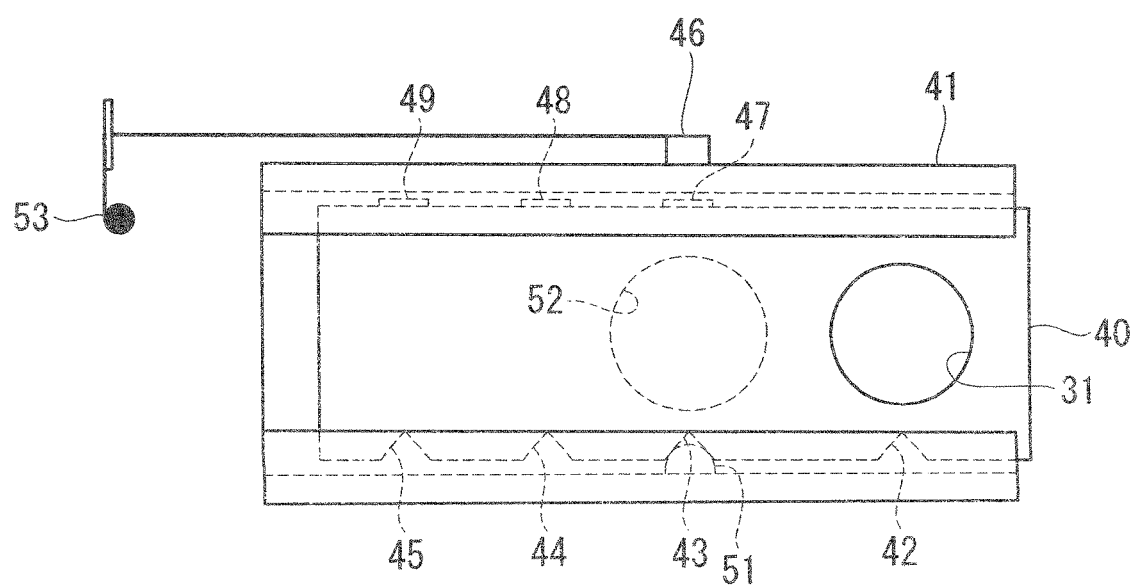
FIG. 4B illustrates another state of the slider in FIG. 4A.
Figure 4C:
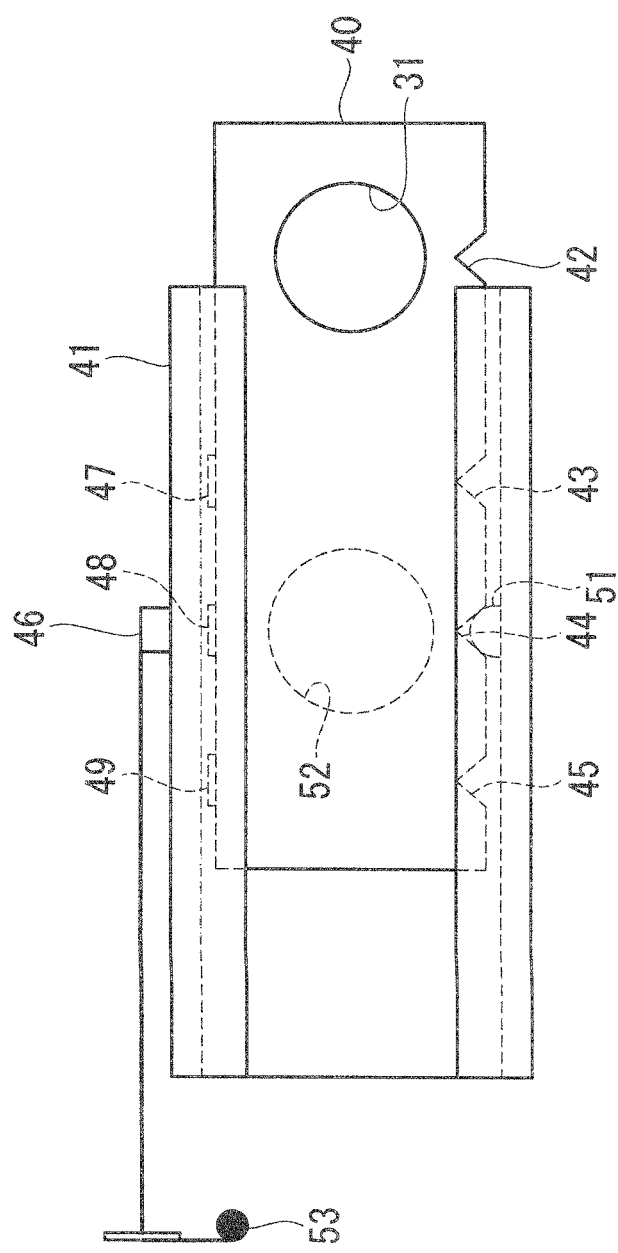
FIG. 4C illustrates another state of the slider in FIG. 4A.
Figure 4D:
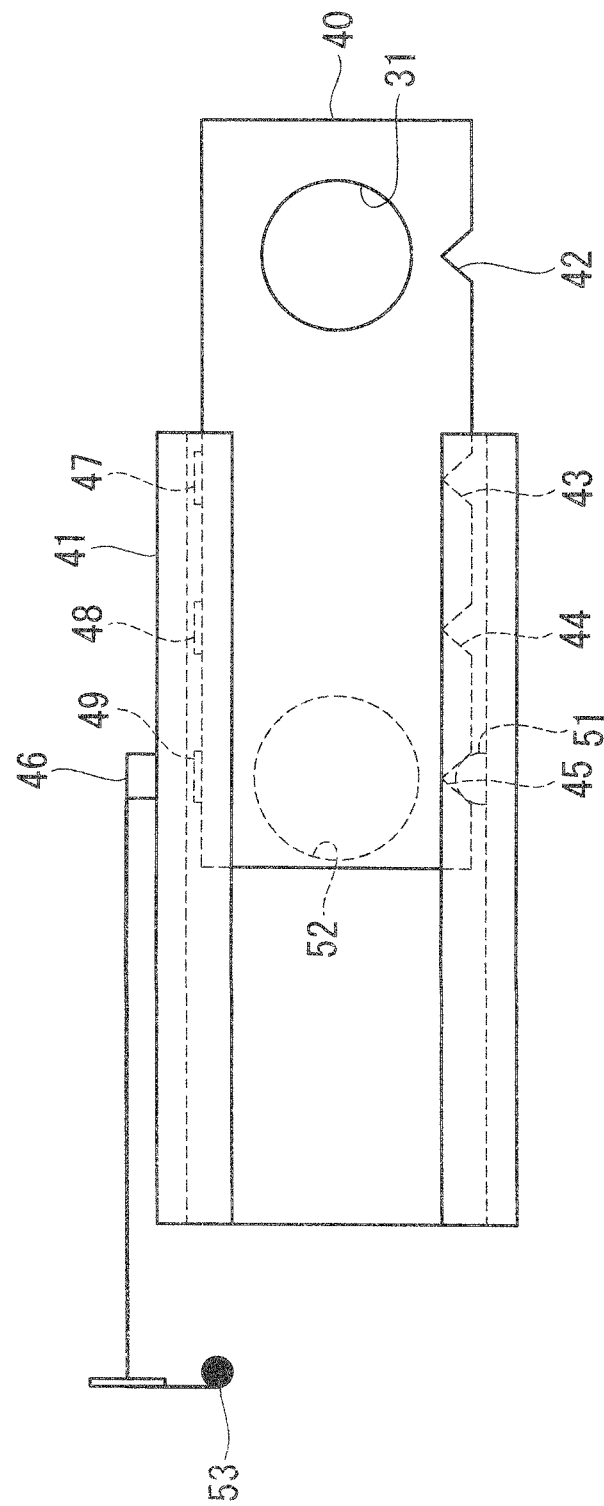
FIG. 4D illustrates another state of the slider in FIG. 4A.

FIGS. 3A and 3B illustrate an example of the configuration of the slider 18. The slider 18 has a plate-like member 40 having the hole 31, as shown in FIG. 3A, and a rail 41 having a hole 52, as shown in FIG. 3B.

The plate-like member 40 is placed in a slidable manner on the rail 41. The plate-like member 40 has a plurality of cutouts 42, 43, 44, and 45 arranged in the sliding direction of the slider 18. The cutout 42 corresponds to bright-field observation, the cutout 43 corresponds to fluorescence observation A, the cutout 44 corresponds to fluorescence observation B, and the cutout 45 corresponds to fluorescence observation C. Fluorescence observation A, fluorescence observation B, and fluorescence observation C are modes for observing fluorescence of different wavelengths. A portion of the plate-like member 40 excluding the hole 31 is composed of a material that does not transmit the illumination light and functions as a shutter that blocks the illumination light.

The rail 41 has a protrusion 51 that is engageable with the cutouts 42, 43, 44, and 45 in the plate-like member 40. The user can slide the plate-like member 40 to engage the protrusion 51 with the cutout 42, 43, 44, or 45 corresponding to the desired observation mode (i.e., bright-field observation, fluorescence observation A, fluorescence observation B, or fluorescence observation C) so as to set a desired observation condition via the controller 5.

For example, if the user intends to perform bright-field observation, the user slides the plate-like member 40 to engage the protrusion 51 with the cutout 42, so that the hole 31 in the plate-like member 40 is disposed on the optical axis. This information is transmitted to the controller 5, and the controller 5 sets bright-field observation. In this case, the hole 31 in the plate-like member 40 and the hole 52 in the rail 41 become aligned with each other on the optical axis, so that the illumination light from the LED 26 can pass through the slider 18.

When the user intends to perform fluorescence observation A, the user slides the plate-like member 40 to engage the protrusion 51 with the cutout 43, so that the hole 31 in the plate-like member 40 is withdrawn from the optical axis. This information is transmitted to the controller 5, and the controller 5 sets fluorescence observation A. In this case, the hole 52 in the rail 41 is overlapped with the portion (shutter) of the plate-like member 40 excluding the hole 31, so that the slider 18 can block the illumination light from the LED 26.

Although the rail 41 has the hole 52 in the above description, an alternative structure is permissible so long as light is not blocked at least by an area that overlaps the optical axis. For example, a portion of the bottom surface of the rail 41 may have an opening.

Next, an example of how a switching operation of the slider 18 performed by the user is detected will be described with reference to FIGS. 4A to 4D. Components given the same reference signs as those in FIGS. 3A and 3B have the same functions as those in the slider 18 in FIGS. 3A and 3B.

The plate-like member 40 includes magnets 47, 48, and 49 (markers, shutter detecting portion) at positions corresponding to the cutouts 43, 44, and 45 (i.e., positions opposite the cutouts 43, 44, and 45 in the direction orthogonal to the sliding direction).

The rail 41 includes a magnetic sensor 46 (sensor, shutter detecting portion) that detects the magnets 47, 48, and 49. Furthermore, the rail 41 includes a limit switch 53 that can be turned on and off by moving the plate-like member 40 in the sliding direction.

If the user intends to perform bright-field observation (FIG. 4A), the user slides the slider 18 to engage the cutout 42 corresponding to bright-field observation with the protrusion 51. In this state, the hole 31 in the slider 18 is disposed on the optical axis so that the hole 31 in the slider 18 and the hole 52 in the rail 41 are aligned with each other on the optical axis. Therefore, the illumination light from the LED 26 passes through the slider 18. The slider 18 in this case is disposed at a position where it presses against the limit switch 53 so as to set the limit switch 53 to an on state. The controller 5 recognizes that the limit switch 53 has been turned on and controls the fluorescence illumination optical system 1 so as to set the LEDs and the fluorescence cubes in a state where bright-field observation is possible. In other words, the controller 5 turns off all of the LEDs in the fluorescence illumination optical system 1 and rotates the fluorescence turret 8 so as to dispose the hole 34, which does not have a fluorescence cube therein, in the optical path.

If the user intends to perform fluorescence observation A (FIG. 4B), the user slides the slider 18 to engage the cutout 43 corresponding to fluorescence observation A with the protrusion 51. In this state, the hole 31 in the slider 18 is withdrawn from the optical axis so that the portion (shutter) excluding the hole 31 is disposed in the optical path. Therefore, the illumination light from the LED 26 is blocked by the slider 18. The slider 18 in this case is disposed at a position where it does not press against the limit switch 53 so that the limit switch 53 is set to an off state, which is recognized by the controller 5. Furthermore, in the process of sliding the slider 18, the magnetic sensor 46 comes to face the magnet 47, so that the controller 5 recognizes that one of the three magnets has been detected by the magnetic sensor 46 (one count).

The controller 5 recognizes that the limit switch 53 is turned off and that one of the three magnets has been detected by the magnetic sensor 46 (one count), and controls the fluorescence illumination optical system 1 so as to set the LEDs and the fluorescence cubes in a state where fluorescence observation A is possible. In other words, the controller 5 turns on the LED for fluorescence observation A and rotates the fluorescence turret 8 so as to dispose the fluorescence cube for fluorescence observation A on the optical axis.

If the user intends to perform fluorescence observation B (FIG. 4C), the user slides the slider 18 to engage the cutout 44 corresponding to fluorescence observation B with the protrusion 51. In this state, the hole 31 in the slider 18 is withdrawn from the optical axis so that the portion (shutter) excluding the hole 31 is disposed in the optical path. Therefore, the illumination light from the LED 26 is blocked by the slider 18. The slider 18 in this case is disposed at a position where it does not press against the limit switch 53 so that the limit switch 53 is set to an off state, which is recognized by the controller 5. Furthermore, in the process of sliding the slider 18, the magnetic sensor 46 sequentially comes to face the magnet 47 and the magnet 48, so that the controller 5 recognizes that two of the three magnets have been detected by the magnetic sensor 46 (two counts).

The controller 5 recognizes that the limit switch 53 is turned off and that the two magnets 47 and 48 have been detected by the magnetic sensor 46 (two counts), and controls the fluorescence illumination optical system 1 so as to set the LEDs and the fluorescence cubes in a state where fluorescence observation B is possible. In other words, the controller 5 turns on the LED for fluorescence observation B and rotates the fluorescence turret 8 so as to dispose the fluorescence cube for fluorescence observation B on the optical axis.

If the user intends to perform fluorescence observation C (FIG. 4D), the user slides the slider 18 to engage the cutout 45 corresponding to fluorescence observation C with the protrusion 51. In this state, the hole 31 in the slider 18 is withdrawn from the optical axis so that the portion (shutter) excluding the hole 31 is disposed in the optical path. Therefore, the illumination light from the LED 26 is blocked by the slider 18. The slider 18 in this case is disposed at a position where it does not press against the limit switch 53 so that the limit switch 53 is set to an off state, which is recognized by the controller 5. Furthermore, in the process of sliding the slider 18, the magnetic sensor 46 sequentially comes to face the magnet 47, the magnet 48, and the magnet 49, so that the controller 5 recognizes that the three magnets 47, 48, and 49 have been detected by the magnetic sensor 46 (three counts).

The controller 5 recognizes that the limit switch 53 is turned off and that the three magnets 47, 48, and 49 have been detected by the magnetic sensor 46 (three counts), and controls the fluorescence illumination optical system 1 so as to set the LEDs and the fluorescence cubes in a state where fluorescence observation C is possible. In other words, the controller 5 turns on the LED for fluorescence observation C and rotates the fluorescence turret 8 so as to dispose the fluorescence cube for fluorescence observation C on the optical axis.

Next, another example of how a switching operation of the slider 18 performed by the user is detected will be described with reference to FIG. 5A.

A slider 120 (irradiation preventing portion) shown in FIG. 5A includes a magnet 54 (marker) provided at an appropriate position of the plate-like member 40 (e.g., a position opposite the cutout 45 in the direction orthogonal to the sliding direction, as shown in FIG. 5A) and a plurality of magnetic sensors 55a, 55b, 55c, and 55d (sensors) that are provided at the rail 41 and that detect the magnet 54.

The magnet 54 and the magnetic sensors 55a, 55b, 55c, and 55d are disposed in correspondence with the cutouts 42, 43, 44, and 45. Specifically, the magnet 54 and the magnetic sensors 55a, 55b, 55c, and 55d are disposed such that one of the magnetic sensors 55a, 55b, 55c, and 55d faces the magnet 54 when the protrusion 51 is engaged with the corresponding one of the cutouts 42, 43, 44, and 45.

The magnetic sensors 55a, 55b, 55c, and 55d are capable of transmitting information to the controller 5. The controller 5 is capable of recognizing that any one of the magnetic sensors 55a, 55b, 55c, and 55d has detected the magnet 54. Accordingly, the controller 5 can recognize which one of the cutouts has been engaged with the protrusion 51 by the user and can detect the observation method desired by the user. The cutout 42 corresponds to bright-field observation, the cutout 43 corresponds to fluorescence observation A, the cutout 44 corresponds to fluorescence observation B, and the cutout 45 corresponds to fluorescence observation C.

If the user intends to perform bright-field observation, the user slides the plate-like member 40 to engage the cutout 42 corresponding to bright-field observation with the protrusion 51. In this state, the hole 31 in the plate-like member 40 is disposed in the optical path and is aligned with the hole 52 in the rail 41 on the optical axis. Therefore, the illumination light from the LED 26 can pass through the slider 120. At the same time, the magnet 54 comes to face the magnetic sensor 55*d*, so that the controller 5 recognizes that the magnet 54 has been detected by the magnetic sensor 55*d*. Upon receiving this information, the controller 5 controls the fluorescence illumination optical system 1 so as to set the LEDs and the fluorescence cubes in a state where bright-field observation is possible. In other words, the controller 5 turns off all of the LEDs 23, 24, and 25 in the fluorescence illumination optical system 1 and rotates the fluorescence turret 8 so as to dispose the hole 34, which does not have a fluorescence cube therein, in the optical path.

If the user intends to perform fluorescence observation A, the user slides the plate-like member 40 to engage the cutout 43 corresponding to fluorescence observation A with the protrusion 51. In this state, the portion (shutter) excluding the hole in the plate-like member 40 is disposed in the optical path so that the light from the LED 26 is blocked. At the same time, the magnet 54 comes to face the magnetic sensor 55*c*, so that the controller 5 recognizes that the magnet 54 has been detected by the magnetic sensor 55*c*. Upon receiving this information, the controller 5 controls the fluorescence illumination optical system 1 so as to set the LEDs and the fluorescence cubes in a state where fluorescence observation A is possible. In other words, the controller 5 turns on the LED 23 for fluorescence observation A and rotates the fluorescence turret 8 so as to dispose the fluorescence cube for fluorescence observation A on the optical axis.

If the user intends to perform fluorescence observation B, the user slides the plate-like member 40 to engage the cutout 44 corresponding to fluorescence observation B with the protrusion 51. In this state, the portion (shutter) excluding the hole 31 in the plate-like member 40 is disposed in the optical path so that the illumination light from the LED 26 is blocked by the slider 120. At the same time, the magnet 54 comes to face the magnetic sensor 55*b*, so that the controller 5 recognizes that the magnet 54 has been detected by the magnetic sensor 55*b*. Upon receiving this information, the controller 5 controls the fluorescence illumination optical system 1 so as to set the LEDs and the fluorescence cubes in a state where fluorescence observation B is possible. In other words, the controller 5 turns on the LED for fluorescence observation B and rotates the fluorescence turret 8 so as to dispose the fluorescence cube for fluorescence observation B on the optical axis.

If the user intends to perform fluorescence observation C, the user slides the plate-like member 40 to engage the cutout 45 corresponding to fluorescence observation C with the protrusion 51. In this state, the portion (shutter) excluding the hole 31 in the plate-like member 40 is disposed in the optical path so that the illumination light from the LED 26 is blocked by the slider 120. At the same time, the magnet 54 comes to face the magnetic sensor 55*a*, so that the controller 5 recognizes that the magnet 54 has been detected by the magnetic sensor 55*a*. Upon receiving this information, the controller 5 controls the fluorescence illumination optical system 1 so as to set the LEDs and the fluorescence cubes in a state where fluorescence observation C is possible. In other words, the controller 5 turns on the LED for fluorescence observation C and rotates the fluorescence turret 8 so as to dispose the fluorescence cube for fluorescence observation C on the optical axis.

Next, another example of how a switching operation of the slider 18 performed by the user is detected will be described with reference to FIG. 5B.

A slider 130 (irradiation preventing portion) shown in FIG. 5B includes optical sensors 59*a*, 59*b*, and 59*c* that are disposed on the undersurface thereof at positions corresponding to the cutouts 43, 44, and 45 in the plate-like member 40 and that detect illumination light. The optical sensors 59*a*, 59*b*, and 59*c* are capable of transmitting information to the controller 5. The controller 5 is capable of recognizing that any one of the optical sensors 59*a*, 59*b*, and 59*c* has detected the illumination light from the LED 26. Accordingly, the controller 5 can recognize which one of the cutouts has been engaged with the protrusion 51 by the user and can detect the observation method desired by the user. The cutout 42 corresponds to bright-field observation, the cutout 43 corresponds to fluorescence observation A, the cutout 44 corresponds to fluorescence observation B, and the cutout 45 corresponds to fluorescence observation C.

If the user intends to perform fluorescence observation A, the user slides the plate-like member 40 to engage the cutout 43 corresponding to fluorescence observation A with the protrusion 51. In this state, the portion (shutter) excluding the hole 31 in the plate-like member 40 is disposed in the optical path so that the illumination light from the LED 26 is blocked by the slider 130. In this case, the optical sensor 59*a* is positioned on the optical axis, so that the controller 5 recognizes that the illumination light from the LED 26 has been detected by the optical sensor 59*a*. Upon receiving this information, the controller 5 controls the fluorescence illumination optical system 1 so as to set the LEDs and the fluorescence cubes in a state where fluorescence observation A is possible. In other words, the controller 5 turns on the LED for fluorescence observation A and rotates the fluorescence turret 8 so as to dispose the fluorescence cube for fluorescence observation A on the optical axis.

If the user intends to perform fluorescence observation B, the user slides the plate-like member 40 to engage the cutout 44 corresponding to fluorescence observation B with the protrusion 51. In this state, the portion (shutter) excluding the hole 31 in the plate-like member 40 is disposed in the optical path so that the illumination light from the LED 26 is blocked by the slider 130. In this case, the optical sensor 59*b* is positioned on the optical axis, so that the controller 5 recognizes that the illumination light from the LED 26 has been detected by the optical sensor 59*b*. Upon receiving this information, the controller 5 controls the fluorescence illumination optical system 1 so as to set the LEDs and the fluorescence cubes in a state where fluorescence observation B is possible. In other words, the controller 5 turns on the LED for fluorescence observation B and rotates the fluorescence turret 8 so as to dispose the fluorescence cube for fluorescence observation B on the optical axis.

If the user intends to perform fluorescence observation C, the user slides the plate-like member 40 to engage the cutout 45 corresponding to fluorescence observation C with the protrusion 51. In this state, the portion (shutter) excluding the hole 31 in the plate-like member 40 is disposed in the optical path so that the illumination light from the LED 26 is blocked by the slider 130. In this case, the optical sensor 59*c* is positioned on the optical axis, so that the controller 5 recognizes that the illumination light from the LED 26 has been detected by the optical sensor 59*c*. Upon receiving this information, the controller 5 controls the fluorescence illumination optical system 1 so as to set the LEDs and the fluorescence cubes in a state where fluorescence observation C is possible. In other words, the controller 5 turns on the LED for fluorescence observation C and rotates the fluorescence turret 8 so as to dispose the fluorescence cube for fluorescence observation C on the optical axis.

If the user intends to perform bright-field observation, the user slides the plate-like member 40 to engage the cutout 42 corresponding to bright-field observation with the protrusion 51. In this state, the hole 31 in the plate-like member 40 is disposed in the optical path and is aligned with the hole 52 in the rail 41 on the optical axis. Therefore, the illumination light from the LED 26 can pass through the slider 130. In this case, the controller 5 recognizes that the light from the LED 26 is not detected by any of the optical sensors 59a, 59b, and 59c. Upon receiving this information, the controller 5 controls the fluorescence illumination optical system 1 so as to set the LEDs and the fluorescence cubes in a state where bright-field observation is possible. In other words, the controller 5 turns off all of the LEDs in the fluorescence illumination optical system 1 and rotates the fluorescence turret 8 so as to dispose the hole 34, which does not have a fluorescence cube therein, in the optical path.

In the examples described above, the user uses a slider to switch between the observation modes. Alternatively, a turret having a hole 32, as shown in FIG. 2B, may be used in place of the slider.

Figure 6B:
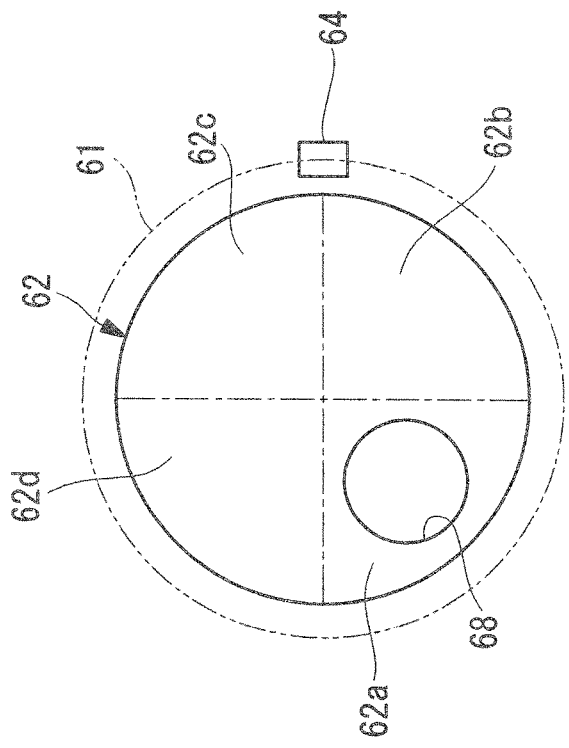
FIG. 6B is a plan view of the turret in FIG. 6A, as viewed from above.
Figure 6C:
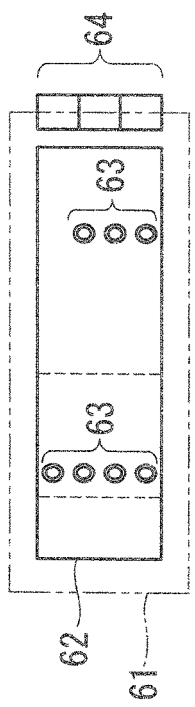
FIG. 6C is a side view of the turret in FIG. 6A, as viewed from the side.

Next, an example of how a turret switching operation performed by the user is detected will be described with reference to FIGS. 6A to 6C.

Figure 6A:
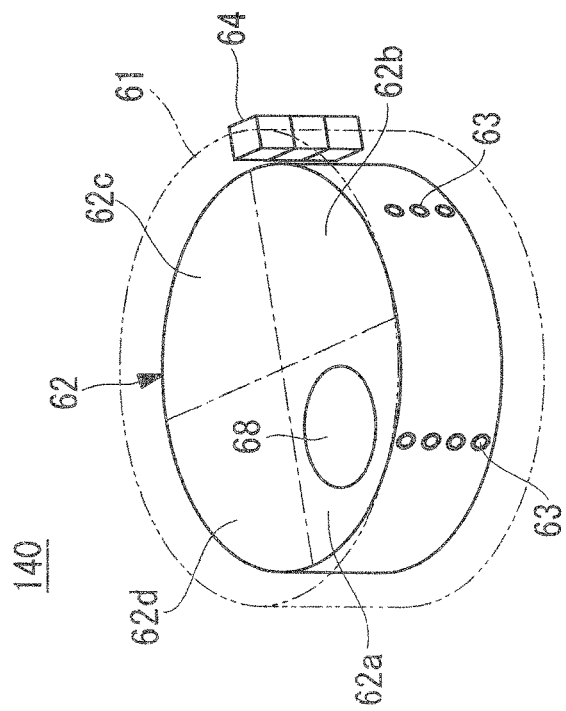
FIG. 6A is an explanatory diagram that schematically illustrates the configuration of the turret (irradiation preventing portion) in the microscope apparatus according to the first embodiment of the present invention.

As shown in FIG. 6A, a turret 140 (irradiation preventing portion) includes a disk member 62 having a hole 68, and a holder 61 that holds the disk member 62 in a rotatable manner in the circumferential direction thereof.

In the disk member 62, regions (i.e., a bright-field observation region 62a, a fluorescence observation A region 62b, a fluorescence observation B region 62c, and a fluorescence observation C region 62d) are allocated to respective observation conditions (i.e., bright-field observation, fluorescence observation A, fluorescence observation B, and fluorescence observation C). The regions 62a, 62b, 62c, and 62d are arranged in the circumferential direction of the disk member 62. When the disk member 62 rotates, the regions 62a, 62b, 62c, and 62d are sequentially disposed one-by-one in the optical path. The hole 68 extends through the bright-field observation region 62a in the thickness direction (i.e., optical axis direction).

The side surfaces of the regions 62a, 62b, 62c, and 62d in the disk member 62 are provided with markers 63 for differentiating among bright-field observation, fluorescence observation A, fluorescence observation B, and fluorescence observation C. For example, the side surface of the bright-field observation region 62a is provided with four markers 63, the side surface of the fluorescence observation A region 62b is provided with three markers 63, the side surface of the fluorescence observation B region 62c is provided with two markers 63, and the side surface of the fluorescence observation C region 62d is provided with one marker 63. Therefore, the regions 62a, 62b, 62c, and 62d can be differentiated from one another based on the number of markers 63.

The holder 61 has four sensors 64 that can detect the markers 63 provided on the side surface of the disk member 62. In this case, one sensor 64 can detect one marker 63. Therefore, the number of markers 63 existing on the side surface of the disk member 62 can be recognized by the four sensors 64. The bottom surface of the holder 61 is configured so as not to block the illumination light at least at a position aligned with the optical axis, such as having a hole at the position aligned with the optical axis.

If the user intends to perform bright-field observation, the user rotates the disk member 62 to a position corresponding to bright-field observation so that the bright-field observation region 62a is disposed in the optical path. In this state, the hole 68 in the disk member 62 is disposed in the optical path, and the components are positioned so that the four markers 63 corresponding to bright-field observation face the sensors 64. Therefore, the illumination light from the LED 26 passes through the hole 68 in the disk member 62. The controller 5 recognizes that the sensors 64 have detected the four markers 63 and controls the fluorescence illumination optical system 1 so as to set the LEDs and the fluorescence cubes in a state where bright-field observation is possible. In other words, the controller 5 turns off all of the LEDs in the fluorescence illumination optical system 1 and rotates the fluorescence turret 8 so as to dispose the hole 34, which does not have a fluorescence cube therein, in the optical path.

If the user intends to perform fluorescence observation A, the user rotates the disk member 62 to a position corresponding to fluorescence observation A so that the fluorescence observation A region 62b is disposed in the optical path. In this state, the hole 68 in the disk member 62 is withdrawn from the optical path and the components are positioned so that the three markers 63 corresponding fluorescence observation A face the sensors 64. Therefore, the illumination light from the LED 26 is blocked by the portion (shutter) excluding the hole 68 in the disk member 62. The controller 5 recognizes that the sensors 64 have detected the three markers 63 and controls the fluorescence illumination optical system 1 so as to set the LEDs and the fluorescence cubes in a state where fluorescence observation A is possible. In other words, the controller 5 turns on the LED for fluorescence observation A and rotates the fluorescence turret 8 so as to dispose the fluorescence cube for fluorescence observation A on the optical axis.

If the user intends to perform fluorescence observation B, the user rotates the disk member 62 to a position corresponding to fluorescence observation B so that the fluorescence observation B region 62c is disposed in the optical path. In this state, the hole 68 in the disk member 62 is withdrawn from the optical path and the components are positioned so that the two markers 63 corresponding to fluorescence observation B face the sensors 64. Therefore, the illumination light from the LED 26 is blocked by the portion (shutter) excluding the hole 68 in the disk member 62. The controller 5 recognizes that the sensors 64 have detected the two markers 63 and controls the fluorescence illumination optical system 1 so as to set the LEDs and the fluorescence cubes in a state where fluorescence observation B is possible. In other words, the controller 5 turns on the LED for fluorescence observation B and rotates the fluorescence turret 8 so as to dispose the fluorescence cube for fluorescence observation B on the optical axis.

If the user intends to perform fluorescence observation C, the user rotates the disk member 62 to a position corresponding to fluorescence observation C so that the fluorescence observation C region 62d is disposed in the optical path. In this state, the hole 68 in the disk member 62 is withdrawn from the optical path and the components are positioned so that the one marker 63 corresponding to fluorescence observation C faces the sensors 64. Therefore, the illumination light from the LED 26 is blocked by the portion (shutter) excluding the hole 68 in the disk member 62. The controller 5 recognizes that one of the sensors 64 has detected the one marker 63 and controls the fluorescence illumination optical system 1 so as to set the LEDs and the fluorescence cubes in a state where fluorescence observation C is possible. In other words, the controller 5 turns on the LED for fluorescence observation C and rotates the fluorescence turret 8 so as to dispose the fluorescence cube for fluorescence observation C on the optical axis.

Next, a microscope apparatus 200 according to a modification of this embodiment will be described.

Figure 7:
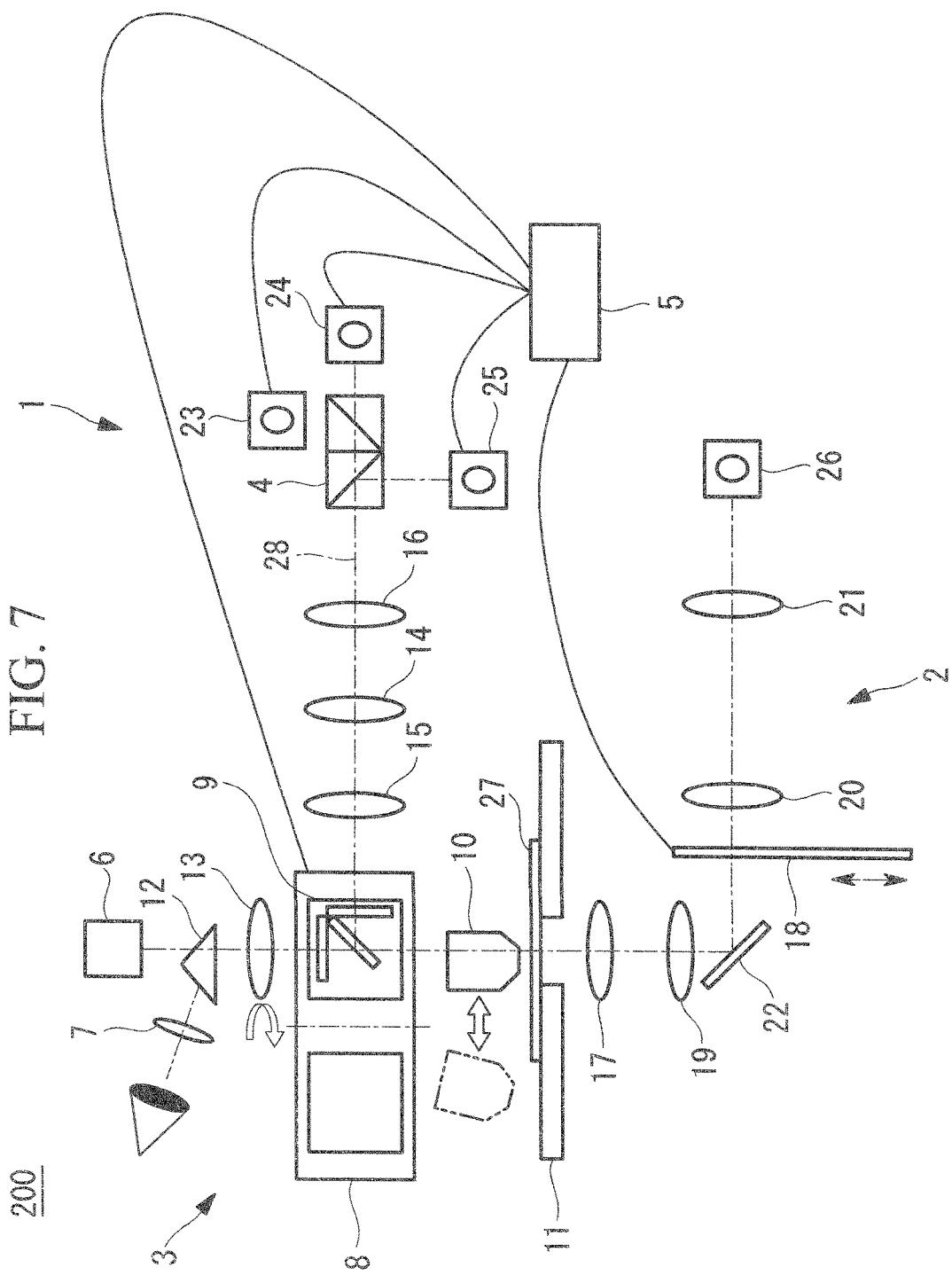
FIG. 7 is an explanatory diagram that schematically illustrates the configuration of a modification of the microscope apparatus according to the first embodiment of the present invention.

Although the slider 18 is disposed between the lens 19 and the condenser lens 17 in FIG. 1, the slider 18 may alternatively be disposed, for example, between the lens 20 and the mirror 22, as shown in FIG. 7.

According to this modification, the slider 18 or a turret is disposed at a position closer to the user's hands that operate the microscope. Therefore, the user can more readily perform the switching operation between bright-field observation and fluorescence observation close-at-hand while operating the microscope.

Figure 8:
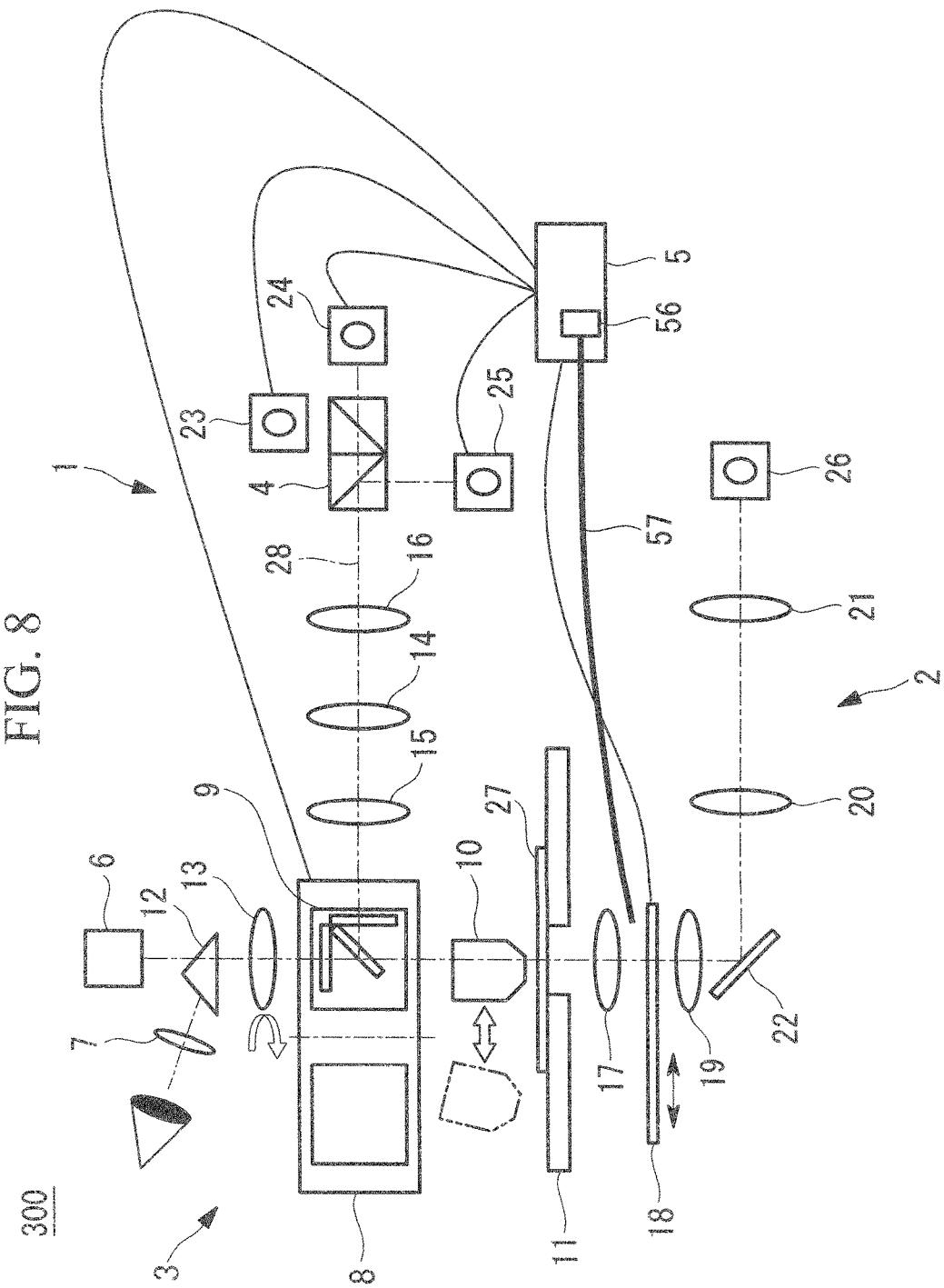
FIG. 8 is an explanatory diagram that schematically illustrates the configuration of another modification of the microscope apparatus according to the first embodiment of the present invention.

Next, a microscope apparatus 300 according to another modification of this embodiment is shown in FIG. 8.

In this modification, the presence or absence of illumination light at the rear side (i.e., the stage 11 side) of the slider 18 is detected, and the switching between bright-field observation and fluorescence observation is performed on the basis of the detection result. As shown in FIG. 8, one end of an optical fiber 57 is disposed at the rear side of the slider 18. A portion of the light at the rear side of the slider 18 is guided by the optical fiber 57, and the presence or absence of illumination light is detected by a sensor 56 disposed at the other end of the optical fiber 57.

When the user slides the slider 18 and withdraws the hole 31 from the optical path so that the illumination light is blocked by the portion (shutter) excluding the hole 31, the illumination light is no longer detected by the sensor 56. In conjunction with the illumination light being no longer detected by the sensor 56, the controller 5 turns on the LEDs 23, 24, and 25 and rotates the fluorescence turret 8 so as to dispose the fluorescence cube 9 in the optical path. On the other hand, when the user slides the slider 18 so as to dispose the hole 31 in the optical path, the illumination light is detected by the sensor 56. In conjunction with the illumination light being detected by the sensor 56, the controller 5 turns off the LEDs 23, 24, and 25 and rotates the fluorescence turret 8 so as to dispose the hole 34, which does not have a fluorescence cube therein, in the optical path.

In this embodiment and the modifications thereof, the arrangement and the number of components of the slider and the turret (such as the cutouts, the protrusion, the magnet, the magnetic sensors, the optical sensors, and the limit switch) are merely examples and may be appropriately changed and optimized.

Furthermore, the number of LEDs serving as excitation light sources is appropriately changeable, and fluorescence cubes corresponding in number to the respective excitation light sources may be installed.

Second Embodiment

Next, a microscope apparatus according to a second embodiment of the present invention will be described with reference to FIGS. 9 and 10.

In the first embodiment described above, the switching between bright-field observation and fluorescence observation is performed in conjunction with a switching operation of the slider 18 performed by the user. In this embodiment, the switching between bright-field observation and fluorescence observation is performed in conjunction with an on-off switching operation of the LED 26 performed by the user.

Figure 9:
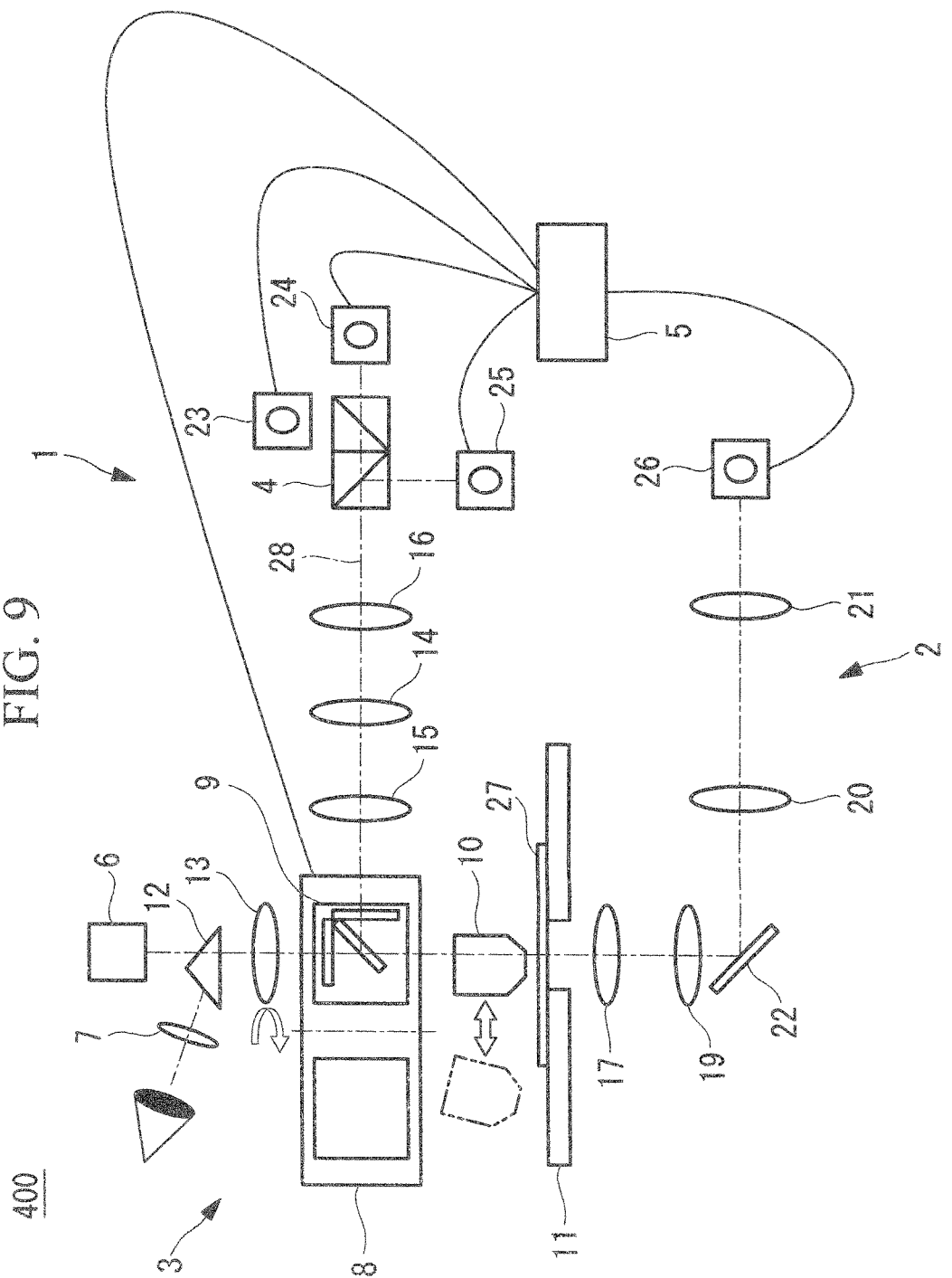
FIG. 9 is an explanatory diagram that schematically illustrates the configuration of a microscope apparatus according to a second embodiment of the present invention.

The following description relates to a case where bright-field observation is performed by using a microscope apparatus 400 according to this embodiment, shown in FIG. 9.

In a state where the LED 26 is turned on, the LEDs 23, 24, and 25 are turned off and the fluorescence turret 8 is set in a state where the hole 34, which does not have a fluorescence cube therein, is disposed in the optical path. Illumination light emitted from the LED 26 is converted into collimated light by the collimator lens 21, passes through the lens 20, and is reflected toward the sample 27 by the mirror 22. The reflected illumination light is radiated onto the sample 27 on the stage 11 via the condenser lens 17. The illumination light (observation light) transmitted through the sample 27 passes through the objective lens 10, the hole 34 in the fluorescence turret 8, and the imaging lens 13 and is distributed to both of or one of the CCD camera 6 and the ocular lens 7 by the prism 12, so as to be observed with both of or one of the CCD camera 6 and the ocular lens 7.

The following description relates to a case where fluorescence observation is performed by using the microscope apparatus 400.

In a state where any one of the LEDs 23, 24, and 25 is turned on, the LED 26 is turned off and the fluorescence turret 8 is set in a state where the fluorescence cube 9 is disposed in the optical path. Excitation light radiated from any one of the LEDs 23, 24, and 25 is converted into substantially collimated light by the collimator lens 16 and passes through the lens 14 and the lens 15. Then, only excitation light of a desired wavelength is selected by the excitation-light filter within the fluorescence cube 9. Subsequently, the excitation light is reflected toward the sample 27 by the dichroic mirror within the fluorescence cube 9 and is focused on the sample 27 on the stage 11 by the objective lens 10.

Fluorescence (observation light) generated from the sample 27 as a result of it being irradiated with the excitation light passes through the objective lens 10 and then through the dichroic mirror within the fluorescence cube 9. Then, only fluorescence of a desired wavelength is selected by the fluorescence filter within the fluorescence cube 9. Subsequently, the fluorescence passes through the imaging lens 13 and is distributed to both of or one of the CCD camera 6 and the ocular lens 7 by the prism 12, so as to be observed with both of or one of the COD camera 6 and the ocular lens 7.

Next, a method of switching between bright-field observation and fluorescence observation by using the microscope apparatus 400 will be described.

When switching from bright-field observation to fluorescence observation, the user turns off a power switch (irradiation preventing portion) of the LED 26. In conjunction with this, the LEDs 23, 24, and 25 are turned on, and the fluorescence turret 8 is rotated so that the fluorescence cube 9 is disposed in the optical path. In this case, for example, the user preliminarily selects which one of the LEDs 23, 24, and 25 is to be turned on.

When switching from fluorescence observation to bright-field observation, the user turns on the power switch of the LED 26. In conjunction with this, the LEDs 23, 24, and 25 are turned off, and the fluorescence turret 8 is rotated so that the hole 34, which does not have a fluorescence cube therein, is disposed in the optical path.

With regard to detection of the power-switch on-off switching operation of the LED 26 performed by the user, for example, the switching operation performed by the user may be detected by the controller 5, and the controller 5 may control the on-off operation of the LEDs 23, 24, and 25 and the rotation of the fluorescence turret 8.

In other words, in conjunction with the power switch of the LED 26 being turned off by the user, the controller 5 turns on the LEDs 23, 24, and 25 and rotates the fluorescence turret 8 so as to dispose the corresponding fluorescence cube in the optical path. In conjunction with the power switch of the LED 26 being turned on by the user, the controller 5 turns off the LEDs 23, 24, and 25 and rotates the fluorescence turret 8 so as to dispose the hole 34, which does not have a fluorescence cube therein, in the optical path.

In this case, the power switch of the LED 26 is disposed close to the user's hands that operate the microscope so that the user can more readily perform the switching operation between bright-field observation and fluorescence observation close-at-hand while operating the microscope.

Figure 10:
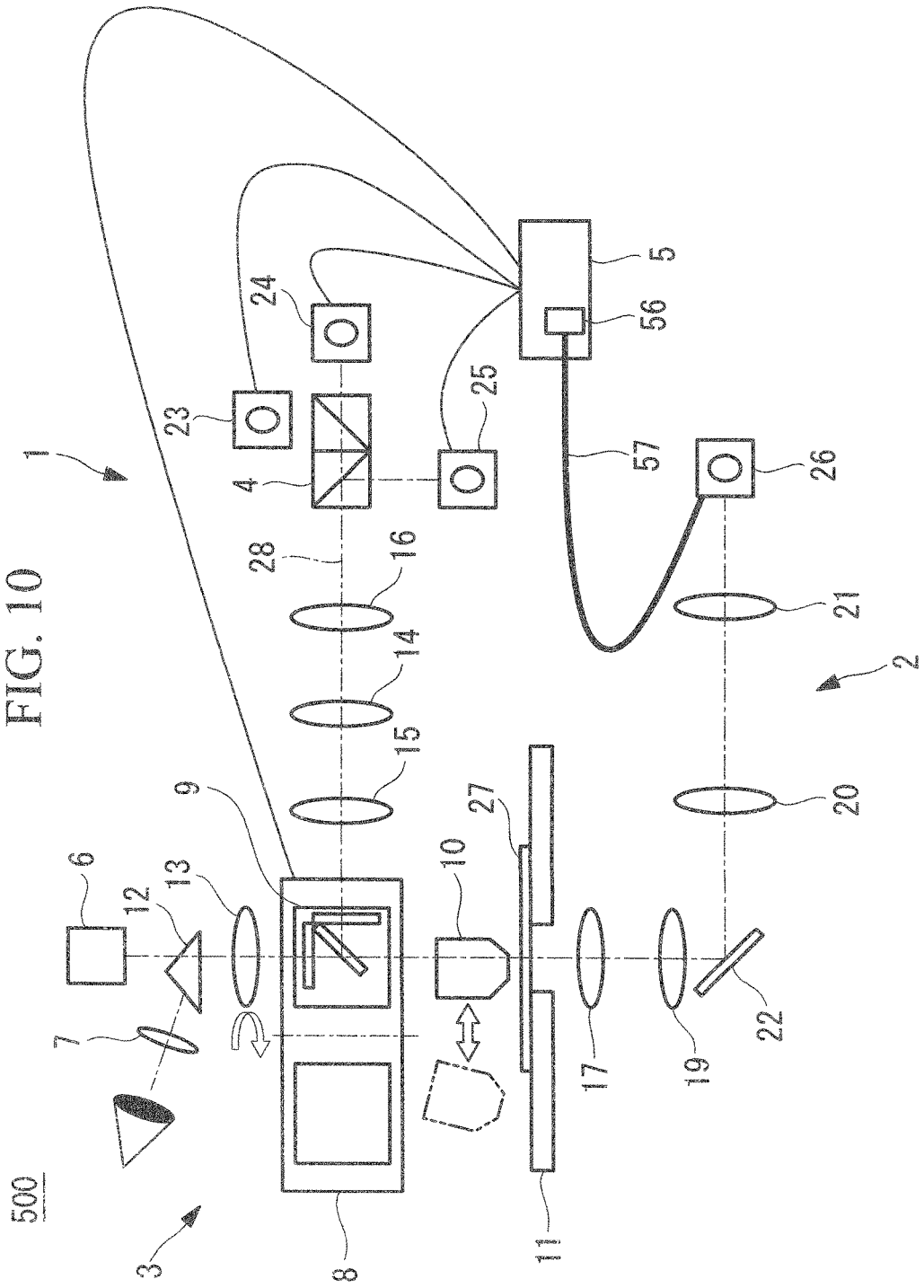
FIG. 10 is an explanatory diagram that schematically illustrates the configuration of a modification of the microscope apparatus according to the second embodiment of the present invention.

A microscope apparatus 500 according to a modification of this embodiment is shown in FIG. 10.

In this modification, the switching between bright-field observation and fluorescence observation is performed by detecting whether or not there is illumination light from the LED 26. As shown in FIG. 10, one end of the optical fiber 57 is disposed in the optical path of the illumination light. A portion of the illumination light emitted from the LED 26 is guided by the optical fiber 57, and the sensor 56 disposed at the other end of the optical fiber 57 detects whether or not there is illumination light.

When the user turns off the LED 26, the illumination light is no longer detected by the sensor 56. In conjunction with the illumination light being no longer detected by the sensor 56, the controller 5 turns on the LEDs 23, 24, and 25 and rotates the fluorescence turret 8 so as to dispose the fluorescence cube 9 in the optical path. On the other hand, when the user turns on the LED 26, the illumination light is detected by the sensor 56. In conjunction with the illumination light being detected by the sensor 56, the controller 5 turns off the LEDs 23, 24, and 25 and rotates the fluorescence turret 8 so as to dispose the hole 34, which does not have a fluorescence cube therein, in the optical path.

Third Embodiment

Next, a microscope apparatus according to a third embodiment of the present invention will be described with reference to FIGS. 11 to 12D.

A microscope apparatus 600 according to this embodiment has the configuration shown in FIG. 11.

The microscope apparatus 600 includes an illumination optical system 65 that radiates illumination light onto the sample 27, an observation optical system 66 used for observing observation light from the sample 27, and a switching mechanism 67 for switching between bright-field observation and fluorescence observation.

The illumination optical system 65 radiates trans-illumination light onto the sample 27 when bright-field observation is performed or radiates excitation light onto the sample 27 when fluorescence observation is performed, and has an LED 29 that emits illumination light including excitation light. The illumination light emitted from the LED 29 is converted into substantially collimated light by the collimator lens 21, passes through the lens 20, is reflected toward the sample 27 by the mirror 22, and is radiated onto the sample 27 on the stage 11 via the lens 19, a first switching portion 68, and the condenser lens 17.

The observation optical system 66 is used for observing observation light from the sample 27 with the CCD camera 6 or by visual observation. The observation light from the sample 27 that has passed through the objective lens 10 passes through a second switching portion 69 and the imaging lens 13 and is distributed to both of or one of the CCD camera 6 and the ocular lens 7 by the prism 12, so as to be observed with both of or one of the CCD camera 6 and the ocular lens 7.

The switching mechanism 67 includes the first switching portion 68, the second switching portion 69, and the controller 5 that controls at least the second switching portion 69.

For example, as shown in FIG. 12A, the first switching portion 68 includes a slider-like member that holds a neutral density (ND) filter 71, an excitation filter 72a, an excitation filter 72b, and an excitation filter 72c. The first switching portion 68 disposes the ND filter 71, the excitation filter 72a, the excitation filter 72b, and the excitation filter 72c in a switchable manner in the optical path.

The excitation filters 72a, 72b, and 72c are bandpass filters that selectively transmit excitation light to be used in fluorescence observation A, fluorescence observation B, and fluorescence observation C. The ND filter 71, the excitation filter 72a, the excitation filter 72b, and the excitation filter 72c correspond to bright-field observation, fluorescence observation A, fluorescence observation B, and fluorescence observation C, respectively.

For example, as shown in FIG. 12C, the second switching portion 69 is a slider-like member that has a hole 73 and that holds emission filters 74a, 74b, and 74c. The hole 73 and the emission filters 74a, 74b, and 74c are arranged in the sliding direction of the slider-like member. The second switching portion 69 disposes the hole 73, the emission filter 74a, the emission filter 74b, and the emission filter 74c in a switchable manner in the optical path.

The emission filters 74a, 74b, and 74c are bandpass filters that selectively transmit fluorescence generated in fluorescence observation A, fluorescence observation B, and fluorescence observation C. The emission filter 74a, the emission filter 74b, and the emission filter 74c correspond to fluorescence observation A, fluorescence observation B, and fluorescence observation C, respectively.

The following description relates to a case where bright-field observation is performed by using the microscope apparatus 600.

Illumination light emitted from the LED 29 is converted into substantially collimated light by the collimator lens 21, passes through the lens 20, and is reflected toward the sample 27 by the mirror 22. The reflected illumination light reaches the first switching portion 68 via the lens 19.

When bright-field observation is performed, the first switching portion 68 is slid so that the ND filter 71 is disposed in the optical path. The illumination light passes through the ND filter 71 and is radiated onto the sample 27 on the stage 11 via the condenser lens 17. The illumination light (observation light) transmitted through the sample 27 reaches the second switching portion 69 via the objective lens 10.

When bright-field observation is performed, the second switching portion 69 is slid so that the hole 73 is disposed in the optical path. The observation light passes through the hole 73, is transmitted through the imaging lens 13, and is distributed to both of or one of the CCD camera 6 and the ocular lens 7 by the prism 12, so as to be observed with both of or one of the CCD camera 6 and the ocular lens 7.

The following description relates to a case where fluorescence observation is performed by using the microscope apparatus 600.

Illumination light radiated from the LED 29 is converted into substantially collimated light by the collimator lens 21, passes through the lens 20, and is reflected toward the sample 27 by the mirror 22. The reflected illumination light reaches the first switching portion 68 via the lens 19.

When fluorescence observation is performed, the first switching portion 68 is slid so that any one of the excitation filter 72a, the excitation filter 72b, and the excitation filter 72c is disposed in the optical path. Excitation light of a desired wavelength is selected from the illumination light by the excitation filter, and the selected excitation light is radiated onto the sample 27 on the stage 11 via the condenser lens 17. Fluorescence (observation light) generated from the sample 27 due to the excitation light reaches the second switching portion 69 via the objective lens 10.

When fluorescence observation is performed, the second switching portion 69 is slid so that any one of the emission filter 74a, the emission filter 74b, and the emission filter 74c is disposed in the optical path. The fluorescence passes through one of the emission filters, is transmitted through the imaging lens 13, and is distributed to both of or one of the CCD camera 6 and the ocular lens 7 by the prism 12, so as to be observed with both of or one of the CCD camera 6 and the ocular lens 7.

Next, a method of switching between bright-field observation and fluorescence observation by using the microscope apparatus 600 will be described.

When switching from bright-field observation to fluorescence observation, the user slides the first switching portion 68 to withdraw the ND filter 71 from the optical path and to dispose any one of the excitation filter 72a, the excitation filter 72b, and the excitation filter 72c in the optical path. In conjunction with this sliding operation of the first switching portion 68, the second switching portion 69 slides to withdraw the hole 73 from the optical path and to dispose the corresponding emission filter (i.e., the emission filter 74a, the emission filter 74b, or the emission filter 74c) in the optical path.

When switching from fluorescence observation to bright-field observation, the user slides the first switching portion 68 to dispose the ND filter 71 in the optical path. In conjunction with this sliding operation of the first switching portion 68, the second switching portion 69 slides to dispose the hole 73 in the optical path.

In this case, the controller 5 detects that the first switching portion 68 has been switched by the user and controls the second switching portion 69. In conjunction with the user sliding the first switching portion 68 to dispose any one of the ND filter 71, the excitation filter 72a, the excitation filter 72b, and the excitation filter 72c in the optical path, the controller 5 slides the second switching portion 69 so as to dispose the hole 73, the emission filter 74a, the emission filter 74b, or the emission filter 74c corresponding to the filter selected by the first switching portion 68 in the optical path. In other words, the controller 5 identifies which one of the filters has been selected by the user via the first switching portion 68 and slides the second switching portion 69 so as to correspond with the selected filter. With regard to how the filter is selected by the user via the first switching portion 68, a technique similar to the technique in the first embodiment may be employed.

In this case, the first switching portion 68 is disposed close to the user's hands that operate the microscope so that the user can more readily perform the switching operation between bright-field observation and fluorescence observation close-at-hand while operating the microscope. Moreover, the number of light sources can be reduced, so that the apparatus can be made compact.

In this embodiment, the first switching portion 68 used may be a turret-like member, as shown in FIG. 12B, in place of the slider in FIG. 12A. Furthermore, the second switching portion 69 used may be a turret-like means, as shown in FIG. 12D, in place of the slider in FIG. 12C.

In the above embodiments and the modifications thereof, the switching between bright-field observation and fluorescence observation is performed in conjunction with the switching operation performed by the user. Alternatively, the controller 5 may include a time manager (not shown) and may switch between bright-field observation and fluorescence observation at time intervals set by the user.

Specifically, although the switching between bright-field observation and fluorescence observation is performed in conjunction with the switching operation of the slider 18 performed by the user in the first embodiment and the modifications thereof, the controller 5 may include a time manager (not shown) and may switch the slider 18 at time intervals set by the user. In conjunction with this switching operation of the slider 18, the controller 5 may switch between bright-field observation and fluorescence observation.

In the second embodiment and the modification thereof, the switching between bright-field observation and fluorescence observation is performed in conjunction with the on-off switching operation of the LED 26 performed by the user. Alternatively, the controller 5 may include a time manager (not shown) and may perform the on-off switching of the LED 26 at time intervals set by the user. In conjunction with this on-off switching of the LED 26, the controller 5 may switch between bright-field observation and fluorescence observation.

In the third embodiment and the modifications thereof, the switching between bright-field observation and fluorescence observation is performed in conjunction with the switching operation of the first switching portion 68 performed by the user. Alternatively, the controller 5 may include a time manager (not shown) and may perform the switching of the first switching portion 68 at time intervals set by the user. In conjunction with this switching of the first switching portion 68, the controller 5 may switch between bright-field observation and fluorescence observation.

In each of the above embodiments, a part of the microscope apparatus may be a detachable unit.

Figure 13:
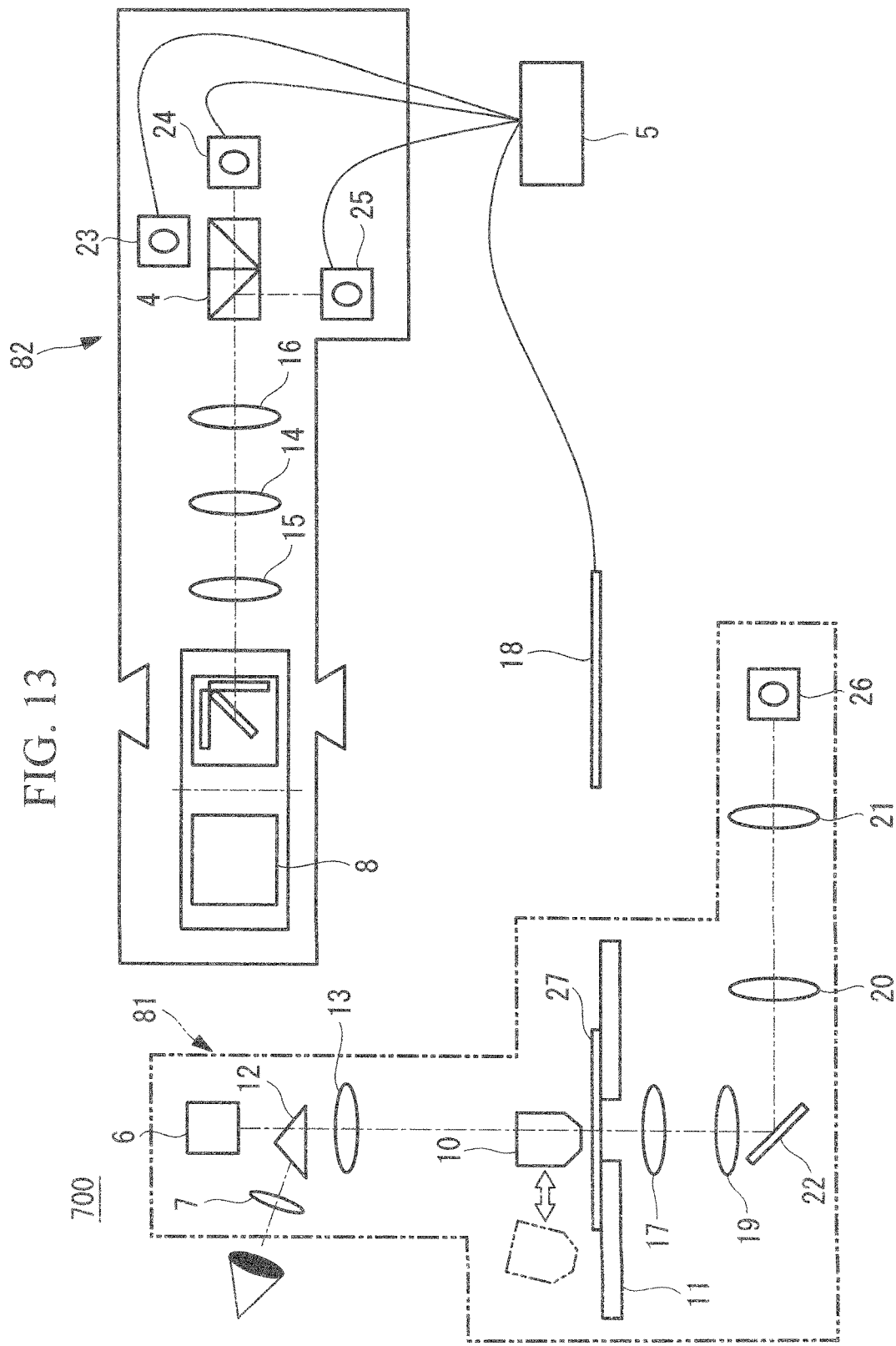
FIG. 13 is an explanatory diagram that schematically illustrates the configuration of a modification of the microscope apparatus according to the first embodiment of the present invention.

FIG. 13 illustrates a microscope apparatus 700 according to a modification of the microscope apparatus 100 in FIG. 1. For example, as shown in FIG. 13, a fluorescence observation unit 82 including the fluorescence illumination optical system 1, the controller 5, and the slider 18 may be detachable from a main microscope body 81.

Figure 14:
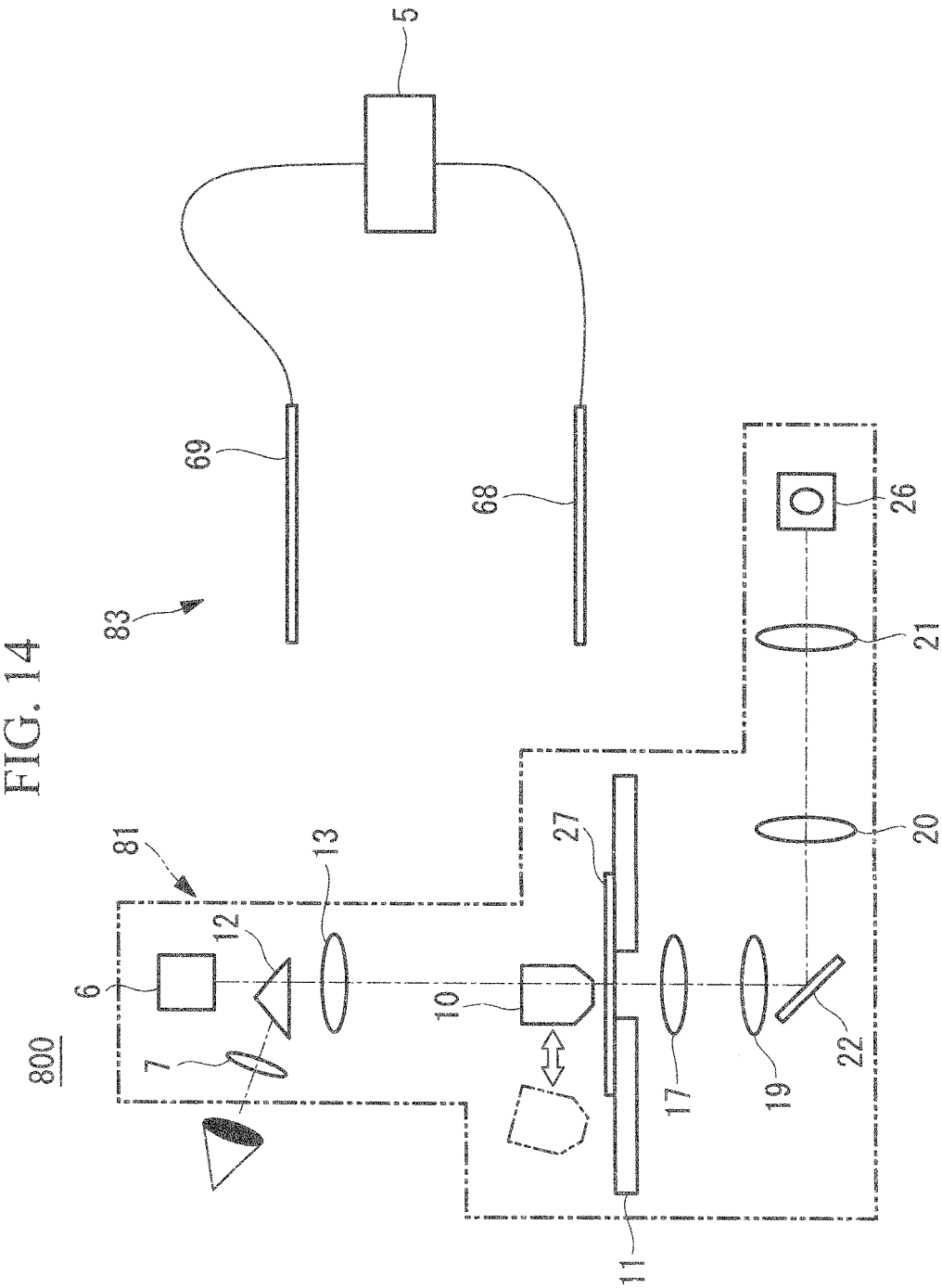
FIG. 14 is an explanatory diagram that schematically illustrates the configuration of a modification of the microscope apparatus according to the third embodiment of the present invention.

FIG. 14 illustrates a microscope apparatus 800 according to a modification of the microscope apparatus 600 in FIG. 11. For example, as shown in FIG. 14, a fluorescence observation unit 83 including the first switching portion 68, the second switching portion 69, and the controller 5 may be detachable from the main microscope body 81.

With such unit configurations, the main microscope body 81 used solely for performing bright-field observation can be readily changed to an apparatus that also allows for fluorescence observation.

Figure 15:
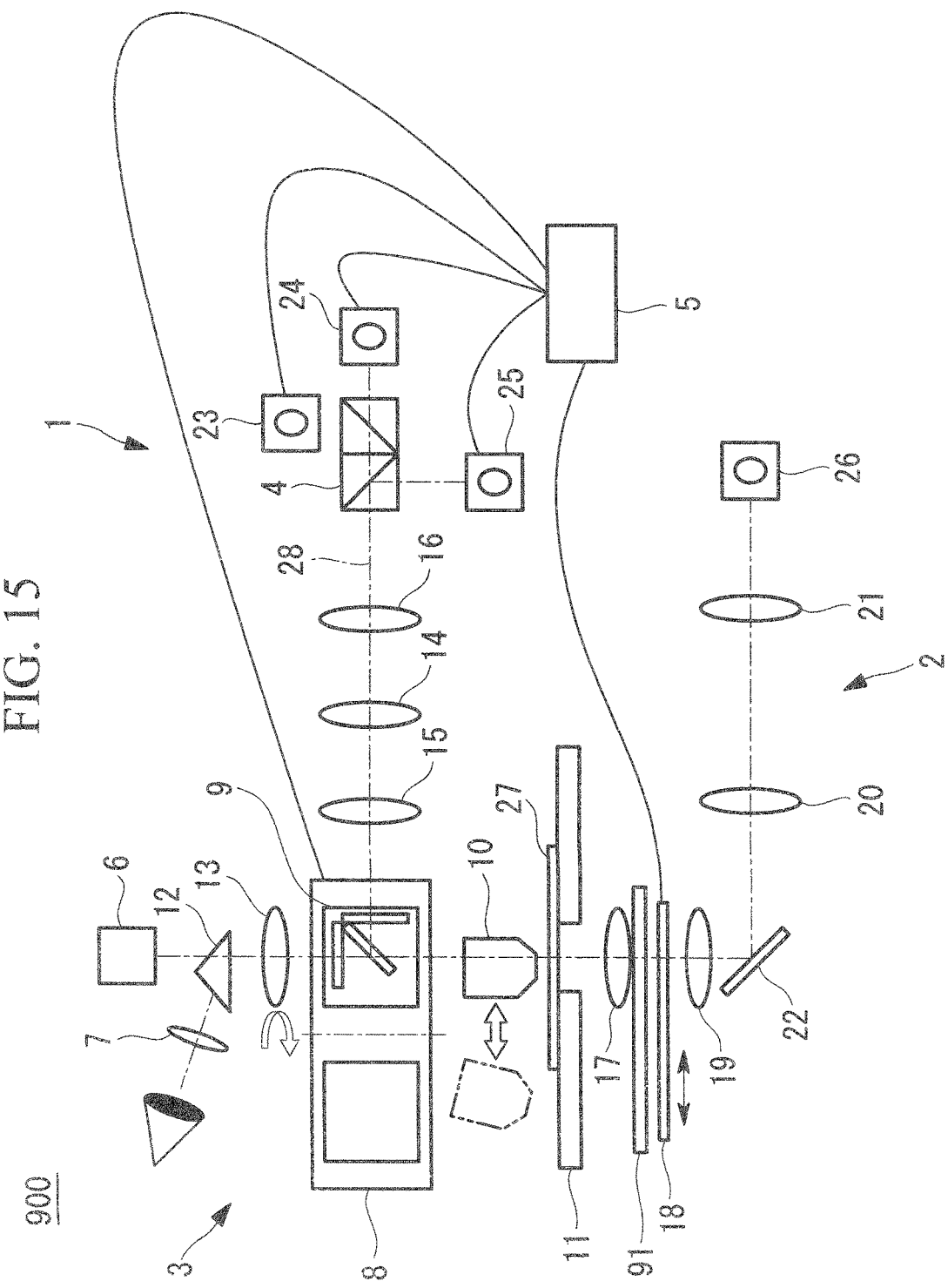
FIG. 15 is an explanatory diagram that schematically illustrates the configuration of a modification of the microscope apparatus according to the first embodiment of the present invention.

In each of the above embodiments, a phase-contrast turret 91 may be used, as in, for example, a microscope apparatus 900 shown in FIG. 15, so as to allow for switching between bright-field observation and phase-contrast observation.

Figure 16:
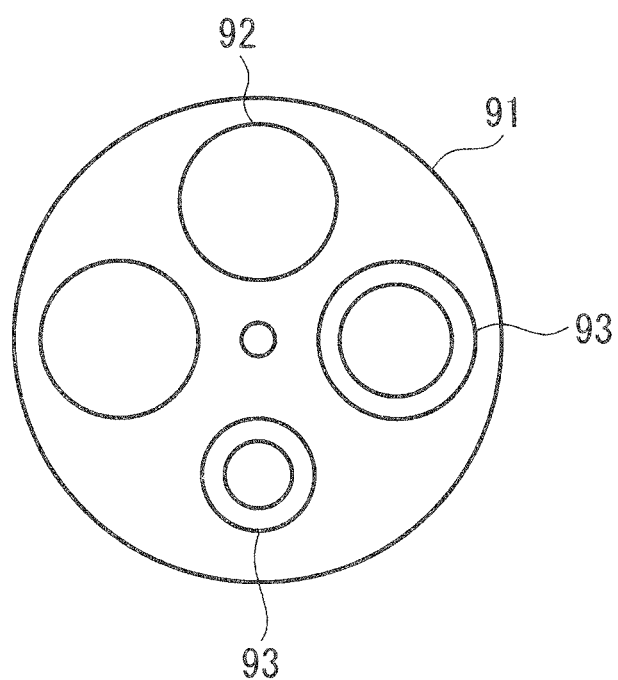
FIG. 16 is an explanatory diagram that schematically illustrates the configuration of a phase-contrast turret according to the present invention.

As shown in FIG. 16, the phase-contrast turret 91 has bright-field openings 92 and phase-contrast openings 93 and can switch between bright-field observation and phase-contrast observation by being rotated in the circumferential direction. In the case of the microscope apparatus 100 in FIG. 1, the phase-contrast turret 91 is disposed, for example, between the slider 18 and the condenser lens 17. In the case of the microscope apparatus 600 in FIG. 11 the phase-contrast turret 91 is disposed, for example, between the first switching portion 68 and the condenser lens 17.

Although LEDs are used as light sources in each of the above embodiments, for example, laser diodes, halogen lamps, metal halide lamps, ultrahigh pressure mercury lamps, or xenon lamps may alternatively be used as the light sources.

A mechanism that adjusts the light quantity of illumination light by changing the voltage applied to the LEDs may be used as an example of a mechanism that keeps the light quantity constant when the objective lens 10 is replaced. Alternatively, the light quantity may be adjusted by adding an ND filter to the optical path.

In each of the above embodiments, the excitation light sources are turned off when bright-field observation is performed. Alternatively, a shutter mechanism (not shown) may be provided in the optical path of the illumination light, and the excitation light may be blocked by the shutter mechanism without turning off the light sources.

In each of the above embodiments, the observation optical system 3 includes the CCD camera 6. Alternatively, the observation optical system 3 may include a complementary metal-oxide semiconductor (CMOS) camera in place of the CCD camera 6. The CCD camera and the CMOS camera may be color cameras or monochrome cameras.

In each of the above embodiments, a dark box having the microscope apparatus disposed therein may be provided. Moreover, a monitor that displays an image to be observed through the observation optical system 3 may be provided.

Figure 17:
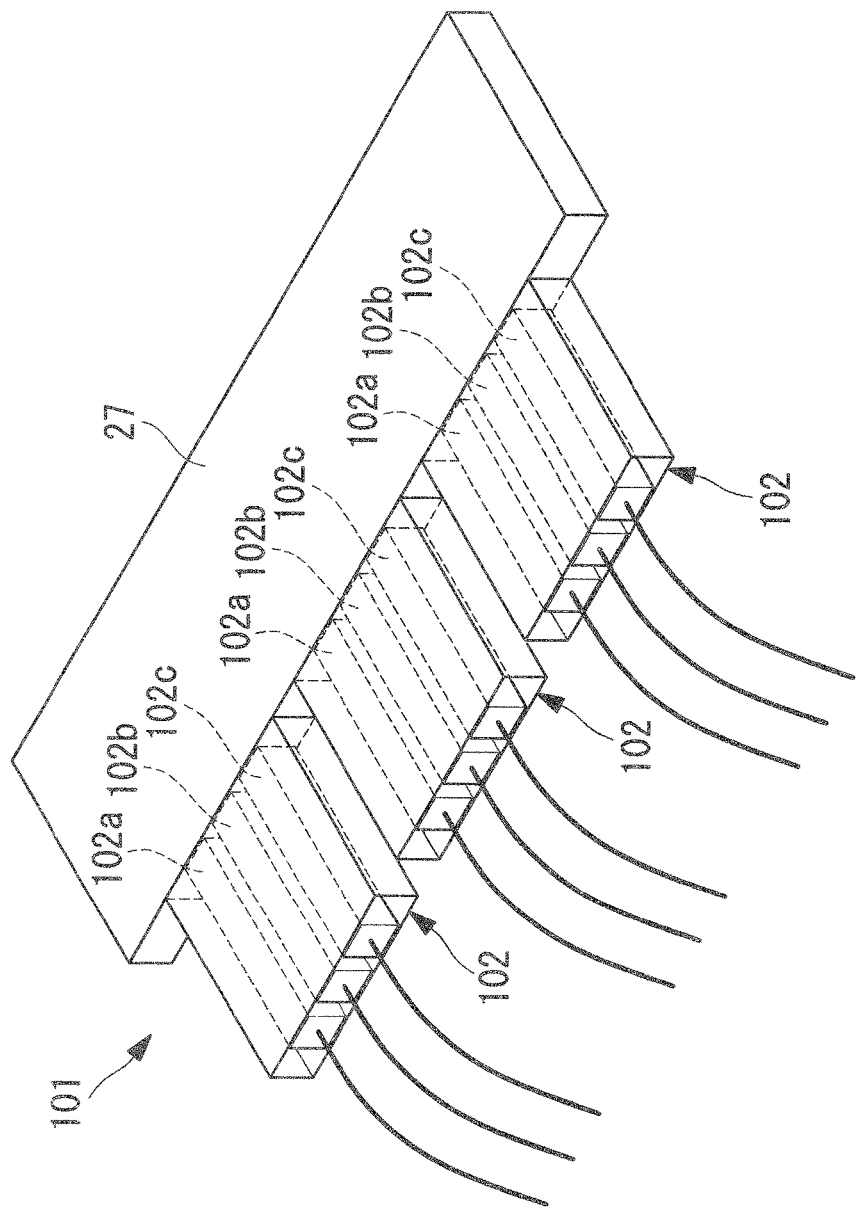
FIG. 17 is an explanatory diagram that schematically illustrates the configuration of a modification of a fluorescence illumination optical system in the microscope apparatus according to the first embodiment of the present invention.

In the first embodiment and the modifications thereof, a fluorescence illumination optical system 101 that radiates excitation light onto the sample 27 from the transverse direction (horizontal direction) of the sample 27 may be used, as shown in FIG. 17, in place of the fluorescence illumination optical system 1.

The fluorescence illumination optical system 101 includes a single light source unit 102 or two or more light source units 102 (three light source units 102 in FIG. 17). Each light source unit 102 includes a plurality of LEDs (three LEDs 102a, 102b, and 102c in FIG. 17) that emit light beams of different wavelengths.

Figure 18:
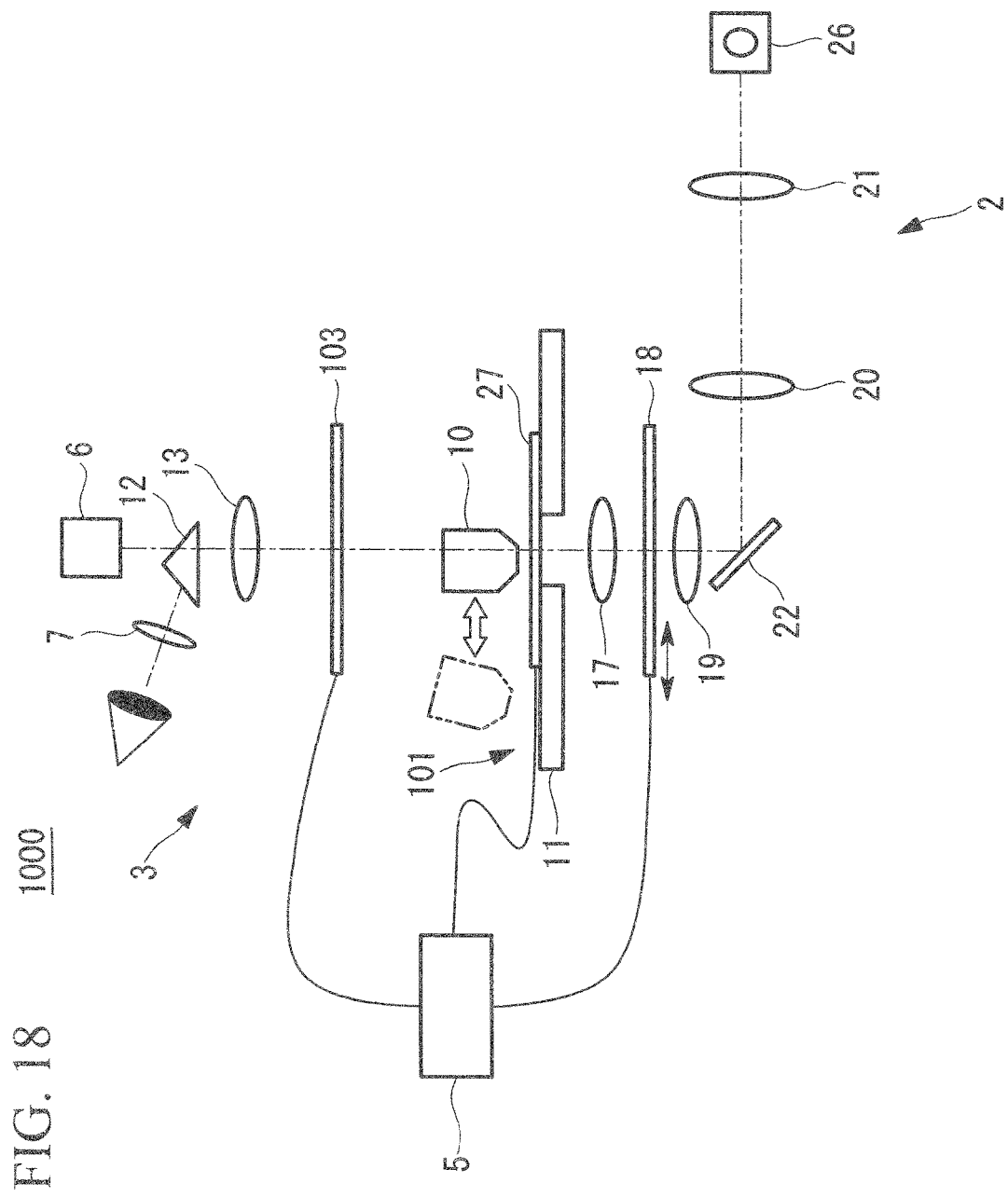
FIG. 18 is an explanatory diagram that schematically illustrates the configuration of a modification of the microscope apparatus according to the first embodiment of the present invention.

Referring to FIG. 18, in a microscope apparatus 1000, the fluorescence illumination optical system 101 is disposed beside the sample 27 (i.e., at a position adjacent to the sample 27 in the horizontal direction), and the controller on-off controls the LEDs 102a, 102b, and 102c in conjunction with the switching operation of the slider 18. Furthermore, the controller 5 controls a switching portion 103 in conjunction with the switching operation of the slider 18 so that an emission filter corresponding to any of the LEDs in an on state can be disposed in the optical path. The switching portion 103 may be similar to the second switching portion 69 in the third embodiment.

The present invention can provide a microscope apparatus that can perform a plurality of observation modes, such as bright-field observation and fluorescence observation, and that includes a switching portion for switching between the plurality of observation modes at a position close to the user's hands that operate the microscope apparatus. When the user selects a desired observation mode by using the switching portion, the microscope apparatus changes the settings of an optical system for the selected observation mode in conjunction with the selection.

A personal computer (PC) may be used as an example of the controller 5 in the present invention, and the controls executed by the controller 5 in the above embodiments and the modifications may be implemented by the PC. In other words, the controller 5 is, for example, a PC comprising a central processing unit (CPU) and a memory. The CPU executes a control program stored in the memory, thereby implementing the functions as the controller 5.

REFERENCE SIGNS LIST 1 fluorescence illumination optical system
2 bright-field illumination optical system
3 observation optical system
4 dichroic mirror
5 controller
6 CCD camera
7 ocular lens
8 fluorescence turret
9, 35, 36, 37 fluorescence cube
10 objective lens
11 stage
12 prism
13 imaging lens
16, 21 collimator lens
17 condenser lens
18 slider (irradiation preventing portion)
19, 20, 21 illumination lens
22 mirror
23, 24, 25 fluorescence illumination light emitting diode
26 trans-illumination light emitting diode
27 sample
28 excitation-light irradiation optical path
29 trans-illumination light emitting diode or fluorescence-and-trans-illumination light emitting diode
31, 32, 34 hole
33 mirror
40 plate-like member
41 rail
42, 43, 44, 45 cutout
46 magnetic sensor
47, 48, 49 magnet
51 protrusion
53 limit switch
54 magnet
55a, 55b, 55c, 55d magnetic sensor
56 sensor
57 optical fiber
59a, 59b, 59c optical sensor
61 holder
62 disk member
63 marker
64 sensor
65 illumination optical system
66 observation optical system
67 switching mechanism
68 first switching portion
69 second switching portion
71 ND filter
72a, 72b, 72c excitation filter
73 hole
74a, 74b, 74c emission filter
81 main microscope body 82, 83 fluorescence observation unit
91 phase-contrast turret
92 bright-field opening
93 phase-contrast opening
102 light source unit
103 switching portion

The invention claimed is:

1. A microscope apparatus comprising:
a bright-field illumination optical system that radiates illumination light onto a sample for performing bright-field observation of the sample;
a fluorescence illumination optical system that radiates excitation light onto the sample for performing fluorescence observation of the sample, the fluorescence illumination optical system including a plurality of excitation light sources having different wavelengths for performing a plurality of kinds of the fluorescence observation;
an observation optical system that observes observation light from the sample; and
a controller that controls at least the fluorescence illumination optical system,
wherein the bright-field illumination optical system includes:
a shutter that prevents irradiation of the sample with the illumination light; and
a shutter detecting portion that detects insertion of the shutter into an optical path of the bright-field illumination optical system and withdrawal of the shutter from the optical path of the bright-field illumination optical system, and that detects switching of the plurality of excitation light sources,
wherein when the controller detects, through the shutter detecting portion, that the shutter is inserted into optical path of the bright-field illumination optical system, the controller causes one of the plurality of excitation light sources that corresponds to information detected by the shutter detecting portion to radiate the excitation light onto the sample, and
wherein when the controller detects, through the shutter detecting portion, that the shutter is withdrawn from the optical path of the bright-field illumination optical system, the controller prevents the irradiation of the excitation light on the sample by the fluorescence illumination optical system.

2. The microscope apparatus according to claim 1, wherein the shutter detecting portion includes a sensor that detects a marker provided on the shutter.

3. The microscope apparatus according to claim 2, wherein the shutter includes a plurality of markers corresponding to the plurality of excitation light sources respectively, and
wherein the controller causes one of the plurality of excitation light sources that corresponds to information about the marker detected by the sensor to radiate the excitation light onto the sample.

4. The microscope apparatus according to claim 3, wherein the shutter further includes a marker corresponding to the bright-field observation.

5. The microscope apparatus according to claim 2, wherein the sensor is a magnetic sensor.

6. The microscope apparatus according to claim 1, wherein the shutter detecting portion includes an optical sensor that detects the illumination light from the bright-field illumination optical system.

7. The microscope apparatus according to claim 1, further comprising at least one fluorescence cube that performs reflection of excitation light and transmission of fluorescence light,
wherein when the controller detects, through the shutter detecting portion, that the shutter is inserted into the optical path of the bright-field illumination optical system, the controller causes the fluorescence cube to be inserted into an optical path of the fluorescence illumination optical system, and
wherein when the controller detects, through the shutter detecting portion, that the shutter is withdrawn from the optical path of the bright-field illumination optical system, the controller causes the fluorescence cube to be withdrawn from the optical path of the fluorescence illumination optical system.

8. The microscope apparatus according to claim 7, wherein the at least one fluorescence cube is a plurality of fluorescence cubes which correspond to the plurality of excitation light sources respectively, and
wherein when the controller detects, through the shutter detecting portion, that the shutter is inserted into the optical path of the bright-field illumination optical system, the controller causes one of the plurality of fluorescence cubes that corresponds to information detected by the shutter detecting portion to radiate the excitation light onto the sample.

* * * * *